(12) United States Patent
O'Neil

(10) Patent No.: US 7,681,531 B2
(45) Date of Patent: Mar. 23, 2010

(54) SYSTEM FOR ASSESSING HABITAT VALUE

(76) Inventor: Thomas O'Neil, P.O. Box 855, Corvallis, OR (US) 97330

( * ) Notice: Subject to any disclaimer, the term of this patent is extended or adjusted under 35 U.S.C. 154(b) by 628 days.

(21) Appl. No.: 11/709,720

(22) Filed: Feb. 21, 2007

(65) Prior Publication Data

US 2007/0204800 A1    Sep. 6, 2007

Related U.S. Application Data

(60) Provisional application No. 60/775,522, filed on Feb. 21, 2006.

(51) Int. Cl.
*A01K 29/00*    (2006.01)
(52) U.S. Cl. ..................... 119/428
(58) Field of Classification Search ................. 119/428, 119/416, 174
See application file for complete search history.

(56) References Cited

U.S. PATENT DOCUMENTS

2006/0122794 A1* 6/2006 Sprague et al. ............... 702/32

OTHER PUBLICATIONS

Paul Adamus, Hydrogeomorphic (HGM) Assessment Guidebook for Tidal Wetlands of the Oregon Coast, Part 1, Rapid Assessment Method, produced by Coos Watershed Association (2006).
Alan P. Ammann and Amanda Lindley Stone, "Method for the Comparative Evaluation of Nontidal Wetlands in New Hampshire," published by New Hampshire Dept of Environmental Services, Mar. 1991.
Paul R. Ashley, "Red River Wildlife Management Area HEP Report: Habitat Evaluation Procedures," 2004 technical Report, Project No. 199303501, BPA Report DOE/BP-00004478-04; 156 pages (Nov. 2004).
Pablo César Benítez-Ponce, Essays on the Economics of Forestry-Based Carbon Mitigation 201 pages (Feb. 11, 2005).
Bongco et al., "Application of Habitat Evaluation Procedure for Impact Assessment Studies in Laguna de Bay, Philippines," Hydrobiologia, 506-509: 811-817 (2003).
Julie G. Bradshaw, "A Technique for the Functional Assessment of Nontidal Wetlands in the Coastal Plain of Virginia," Virginia Institute of Marine Science, Special Report No. 315; 65 pages (1991).
Breaux et al., "Wetland Ecological and Compliance Assessments in the San Francisco Bay Region, California, USA," *Jnl. Envir. Mangmt*, 74: 217-237 (2005).

(Continued)

*Primary Examiner*—Yvonne R. Abbott
(74) *Attorney, Agent, or Firm*—Klarquist Sparkman, LLP

(57) ABSTRACT

A system for quantifying or assigning values to habitats and/or species occurring within a geographic site. In one implementation, for example, a baseline habitat value is assigned to a geographic site prior to the performance of a proposed activity impacting the site, such as development or construction. The baseline habitat value is based at least in part on the specific types of habitats found in the site, the number of species found in the site, and the key ecological functions associated with each species. The baseline habitat value can be adjusted to account for the potential presence of invasive plant species within the site. A future habitat value for the site following the performance of the activity also can be determined. A debit value associated with the proposed activity can be determined by subtracting the future habitat value from the baseline habitat value.

31 Claims, 4 Drawing Sheets

OTHER PUBLICATIONS

Brown et al., "Application of a Variance Decomposition Method to Compare Satellite and Aerial Inventory Data: A Tool for Evaluating Wildlife-Habitat Relationships," *Jnl Appl. Ecology*, 43, 173-184 (2006).

California Coastal Commission, "Procedural Guidance for the Review of Wetland Projects in California's Coastal Zone,".

Carlisle et al., "Wetland Ecological Integrity: An Assessment Approach," produced by the Massachusetts Coastal Zone Management, 171 pages (Mar. 31, 1998).

Carroll et al., "Carnivores as Focal Species for Conservation Planning in the Rocky Mountain Region," *Ecological Applications*, 11(4): 961-980 (Aug. 2001).

Castelle et al., "Wetland Mitigation Replacement Ratios Defining Equivalency," Washington State Dept. of Ecology, Publication #92-08 (Feb. 1992).

F. S. Danks and D. R. Klein, "Using GIS to Predict Potential Wildlife Habitat: A Case Study of Muskoxen in Northern Alaska," *Int. J. Remote Sensing*, 23:21 4611-4632 (2002).

Peter J. Dodd and Mark Maurer, "Wildlife Habitat Evaluation/Upland Mitigation: The PennDOT Perspective".

Dolloff et al., "A Comparison of Basinwide and Representative Reach Habitat Survey Techniques in Three Southern Appalachian Watersheds," *North Amer. Jnl of Fisheries Mangmt*, 17:339-347 (1997).

Patrick Duffy, "Agriculture, Forestry and Fisheries: the Orphans of Environmental Impact Assessment," *Impact Assessment and Project Appraisal*, 22:3 175-176 (Sep. 2004).

Dunford et al., "The Use of Habitat Equivalency Analysis in Natural Resource Damage Assessments," *Ecological Economics*, 48: 49-70 (2004).

EFAB/EFC Guidebook, "6. Tools for Lowering Costs," 178 pages (Apr. 1999).

Felix et al., "Development of Landscape-scale Habitat-potential Models for Forest Wildlife Planning and Management," *Wildlife Society Bulletin*, 32(3): 795-806 (2004).

Fennessy et al., "Review of Rapid Assessment Methods for Assessing Wetland Condition," Environmental Monitoring and Assessment Program, U.S. Environmental Protection Agency, EPA/620/R-04/009, Jan. 2004.

Gaines et al., "Landscape Evaluation of Female Black Bear Habitat Effectiveness and Capability in the North Cascades, Washington," *Biological Conserv.*, 125:411-425 (2005).

T. Luke George and Steve Zack, "Spatial and Temporal Considerations in Restoring Habitat for Wildlife," *Restoration Ecology*, 9(3):272-279 (2001).

Weidong Gu and Robert K. Swihart, "Absent or Undetected? Effects of Non-Detection of Species Occurrence on Wildlife-Habitat Models," *Biological Conservation*, 116:195-203 (2004).

Antoine Guisan and Nicklaus E. Zimmerman, "Predictive Habitat Distribution Models In Ecology," *Ecological Modelling*, 135:147-186 (2000).

Fred Guterl, "Investing in Green," *Newsweek*, Jun. 6, 2005.

"HAB Primer: An Introduction to the Habitat Appraisal and Barter (HAB) method for Fish & Wildlife Habitat Assessment," Northwest Habitat Institute, Mar. 21, 2007.

Hampel et al., "Habitat Value of a Developing Estuarine Brackish Marsh for Fish and Macrocrustaceans," *ICES Jnl of Marine Science*, 60:278-289 (2003).

Hong et al. "Ecotope Mapping for Landscape Ecological Assessment of Habitat and Ecosystem," *Ecological Research*, 19:131-139 (2004).

Thomas Hruby, Washington State Wetland Rating System for Eastern Washington, Washington State Department of Ecology, Ecology Publication #02-06-019 (Oct. 2002).

Tom Hruby et al., "Methods of Assessing Wetland Functions, vol. I: Riverine and Depressional Wetlands in the Lowlands of Western Washington, Part 1: Assessment Methods," Washington State Department of Ecology, Ecology Publication #99-115 (Jul. 1999).

Chris J. Johnson and Michael P. Gillingham, "Mapping Uncertainty: Sensitivity of Wildlife Habitat Ratings to Expert Opinion," *Jnl of Appl Ecology*, 41:1032-1041 (2004).

Johnson et al., "A Quantitative Approach to Conservation Planning: Using Resource Selection Functions to Map the Distribution of Mountain Caribou at Multiple Spatial Scales," *Jnl of Appl Ecology*, 41:238-251 (2004).

Kapustka et al., "Using Landscape Ecology to Focus Ecological Risk Assessment and Guide Risk Management Decision-Making," *Toxicology and Industrial Health*, 17:236-246 (2001).

Nicolas Lamouroux and Yves Souchon, "Simple Predictions of Instream Habitat Model Outputs for Fish Habitat Guilds in Large Streams," *Freshwater Biology*, 47:1531-1542 (2002).

Li et al., "Habitat Evaluation for Crested Ibis: A GIS-based Approach," *Ecological Research*, 17:565-573 (2002).

Loiselle et al., "Avoiding Pitfalls of Using Species Distribution Models in Conservation Planning," *Conserv. Biology*, 17(6):1591-1600 (2003).

John J. Mack, Ohio Rapid Assessment Method for Wetlands, Manual for Using Version 5.0, Ohio EPA Technical Bulletin Wetland/2001-1-1, Ohio Environmental Protection Agency, Division of Surface Water (Feb. 1, 2001).

McDermid et al., "Remote Sensing for Large-Area Habitat Mapping," *Progress in Physical Geography*, 29(4):449-474 (2005).

Mick Micacchion, "Integrated Wetland Assessment Program, Part 7: Amphibian Index of Biotic Integrity (AmphIBI) for Ohio Wetlands," Ohio EPA Technical Report WET/2004-7, State of Ohio Environmental Protection Agency, (2004).

Raymond E. Miller, Jr. and Boyd E. Gunsalus, "Wetland Rapid Assessment Procedure (WRAP)," Natural Resource Management Division Regulation Department South Florida Water Management District, Technical Publication Reg-001, (Sep. 1999).

Mitigation Operations Manual, pp. 4-1 through 4-25 (Feb. 21, 2005).

"MNRAM 3.0," Assessment guide for valuating wetland functions (Feb. 1, 2006).

Ogden et al., "The Use of Conceptual Ecological Models to Guide Ecosystem Restoration in South Florida," *Wetlands*, 25(4): 795-809 (2005).

ONeil, "A Multi-Value Habitat Evaluation Procedure for Fish and Wildlife," abstract, in Northwest Naturalist, vol. 86, p. 111 (Autumn 2005), presented at the 2005 Annual Meetings of the Society for Northwestern Vertebrate Biology and the Oregon Chapter of the Wildlife Society, held Feb. 22-25, 2005.

ONeil et al., "The Habitat-Species-Function Triad: A Planning Framework for Ecoprovinces and Subbasins," abstract, in Northwest Naturalist, vol. 86, p. 111 (Autumn 2005), presented at the 2005 Annual Meetings of the Society for Northwestern Vertebrate Biology and the Oregon Chapter of the Wildlife Society, held Feb. 22-25, 2005.

ONeil et al., "Mapping at Multiple Scales Using a Consistent Wildlife Habitat Classification to Improve Transportation & Conservation Planning," (Jan. 2008) presented at the 87$^{th}$ annual meetings of the Transportation Research Board, held Jan. 13-17, 2008, Washington, D.C.

Ortigosa et al., "VVF: Integrating Modelling and GIS in a Software Tool for Habitat Suitability Assessment," *Environmental Modelling & Software*, 15:1-12 (2000).

Pearce et al., "Incorporating Expert Opinion and Fine-Scale Vegetation Mapping Into Statistical Models of Faunal Distribution," *Jnl of Applied Ecology*, 38:412-424 (2001).

John P. Perkins, "Like a Cool Drink of Water," Review of Wildlife-Habitat Relationships in Oregon and Washington in *Conserv. Biology*, 16(3):852-853 (2002).

David J. Price and Wesley J. Birge, "Effectiveness of Stream Restoration Following Highway Reconstruction Projects on Two Freshwater Streams in Kentucky," *Ecological Engineering*, 25:73-84 (2005).

Raxworthy et al., "Predicting Distributions of Known and Unknown Reptile Species in Madagascar," *Nature*, 42(18/25):837-841 (2003).

Roth et al., "Oregon Freshwater Wetland Assessment Methodology," published by Wetlands Program, Oregon Division of State Lands, Apr. 1996.

Rushton et al., "New Paradigms for Modelling Species Distributions?" *Jnl of Appl Ecology*, 41:193-200 (2004).

Leonard Shabman and Paul Scodari, "The Future of Wetlands Mitigation Banking," *Choices*, 2005.

Smith et al., "An Approach for Assessing Wetland Functions Using Hydrogeomorphic Classification, Reference Wetlands, and Functional Indices," Wetlands Research Program Technical Report WRP-DE-9, US Army Corps. Of Engineers (Oct. 1995).

Ron Store and Jukka Jokimäki, "A GIS-based Multi-scale Approach to Habitat Suitability Modeling," *Ecological Modeling*, 169:1-15 (2003).

Thom et al., "Balancing the Need to Develop Coastal Areas with the Desire for an Ecologically Functioning Coastal Environment: Is Net Ecosystem Improvement Possible?" *Restoration Ecology*, 13(1):193-203 (Mar. 2005).

"Assessing Conditions of Riparian-Wetland Corridors at the Areawide Level," Watershed Science Institute Technical Report, published by the United States Department of Agriculture (Sep. 1999).

U.S. Fish & Wildlife Service, Division of Ecological Services, Department of the Interior, "Habitat Evaluation Procedure (HEP), ESM 102," Mar. 31, 1980.

Washington State Wetlands Rating System, Western Washington, $2^{nd}$ Edition, Washington State Department of Ecology, Publication #93-74 (Aug. 1993).

Wisconsin Department of Natural Resources, "Rapid Assessment Methodology for Evaluating Wetland Functional Values" 8 pages (Jan. 2001).

Declaration of M. Kenna Halsey, Jan. 28, 2008 (6 pages).

Comprehensive Mitigation/Conservation Strategy (CMCS)—Draft Program Manual, Apr. 2004.

Comprehensive Mitigation/Conservation Strategy—Statewide Mitigation/Conservation Banking Agreement, Oct. 2004.

Mitigation Operations Manual—vol. 1: Using an ODOT Mitigation/Conservation Bank—Draft, Mar. 2005.

* cited by examiner

SYSTEM FOR ASSESSING HABITAT VALUE

CROSS-REFERENCE TO RELATED APPLICATION

The present application claims the benefit of U.S. Provisional Application No. 60/775,522, filed Feb. 21, 2006, which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

FIELD

The present disclosure concerns embodiments of a system for assessing habitat value, such as for use in evaluating environmental impacts of development to a geographic site and/or proposed enhancement activities to a site.

BACKGROUND

While traditional environmental management approaches have made significant improvements to the ecosystem, they nonetheless have various shortcomings. For example, current federal guidelines require developers of wetlands to provide replacement wetlands (known as wetlands "credits") on an acre per acre basis. Unfortunately, this system often does not result in long-term ecological success because replacement wetlands typically are not "in-kind"; that is, the replacement wetlands are not similar to the types of wetlands filled, primarily because the type and extent of the habitat types and species can vary greatly between two areas.

Recently, a new approach to wetlands management, called "wetlands mitigation banking," has been instituted in a number of jurisdictions. Under this approach, a land developer or a state Department of Transportation generates credits by developing or restoring wetlands. The credits are certified by the Army Corp of Engineers and then deposited in a "bank account" that can be drawn upon for future development. Mitigation banking offers greater oversight and greater incentive to generate credits, and therefore can increase the chances of ecological success. However, the credit/debit system is based on the arbitrary notion that filled wetlands can be replaced or restored on an acre per acre basis.

Thus, it would be desirable to provide a system for quantifying or assigning values to habitats and/or species for use in mitigation banking programs and other conservation programs to more accurately determine the impact of development and the offsets needed to ensure ecological success.

SUMMARY

The present disclosure concerns an "accounting" system for quantifying or assigning values to habitats and/or species occurring within a geographic site. In one implementation, for example, a baseline habitat value is assigned to a geographic site prior to the performance of a proposed activity impacting the site, such as development or construction. The baseline habitat value is based at least in part on the specific types of habitats found in the site, the number of species found in the site, and the key ecological functions associated with each species. The baseline habitat value can be adjusted to account for the potential presence of invasive plant species within the site and/or dynamic events that can affect the value of the site, such as a fire. A future habitat value for the site following the performance of the activity also can be determined. A debit value associated with the proposed activity can be determined by subtracting the future habitat value from the baseline habitat value.

In one representative embodiment, a method is provided for establishing a habitat value for at least one habitat type within a geographic site comprising one or more habitat types. The method comprises determining a potential species group, the potential species group comprising vertebrate species that are potentially present at the geographic site. A set of potential ecological functions is determined for each of the one or more habitat values, the set of potential ecological functions comprising a plurality of types of potential ecological interactions between species of the potential species group and the one or more habitat types at the geographic site. A functional capacity value is determined for at least one selected habitat type of the one or more habitat types based on the potential ecological functions associated with the at least one selected habitat type. A habitat value is determined for the at least one selected habitat type based at least in part upon the functional capacity value. The determined habitat value for the at least one selected habitat type can then be recorded.

In particular embodiments, the act of determining a functional capacity value for at least one selected habitat type comprises determining a weighted value for each potential ecological function of the set of potential ecological functions for the at least one selected habitat type, combining the weighted values of the potential ecological functions for the at least one selected habitat type to provide a combined value for the at least one selected habitat type, and modifying the combined value to derive the functional capacity value the at least one selected habitat type.

The habitat value for the entire geographic site can be determined by summing the functional capacity values for each habitat type and multiplying the sum by the area of the entire site. In particular embodiments, the geographic site is subdivided into individual map units corresponding to a specific habitat type and structural condition, if any, occurring within the habitat type. A habitat value for each map unit can be determined by multiplying the sum of the functional capacities by the area of the map unit and then dividing by the proportional extent of the habitat type with respect to the entire site.

The habitat value for each map unit can be adjusted to account for the presence of potential invasive plant species by multiplying the habitat value for the map unit by an invasive species factor corresponding to the coverage of invasive species in each structural layer present in the map unit. An adjusted habitat value for the entire site can be determined by summing the adjusted habitat value for each map unit in the site.

The habitat values for each map unit can also be modified to account for the diversity of ecological correlates present in the habitat type of each map unit.

In another representative embodiment, a method is provided for establishing a habitat value for a geographic site subdivided into a plurality of map units, wherein the map units correspond to respective portions of the geographic site. The map units are based at least in part upon habitat types included in the geographic site, with each map unit being associated with a single habitat type. The method comprises establishing a habitat value for each map unit included within the geographic site and combining habitat values for at least a selected plurality of the map units to establish a potential habitat value for that portion of the geographic site corresponding to the selected plurality of map units.

In another representative embodiment, a method is provided for establishing a habitat value for a geographic site subdivided into a plurality of map units. The map units are based at least in part upon habitat types included in the geographic site, with each map unit being associated with a single habitat type. The method comprises establishing a habitat value for each map unit included within the geographic site, and combining habitat values for at least a selected plurality of the map units to establish a potential habitat value for that portion of the geographic site corresponding to the selected plurality of map units. The act of establishing a habitat value further comprises the act of determining a species-specific value for the geographic site.

The foregoing and other objects, features, and advantages of the invention will become more apparent from the following detailed description, which proceeds with reference to the accompanying figures.

DETAILED DESCRIPTION

Figure 1:
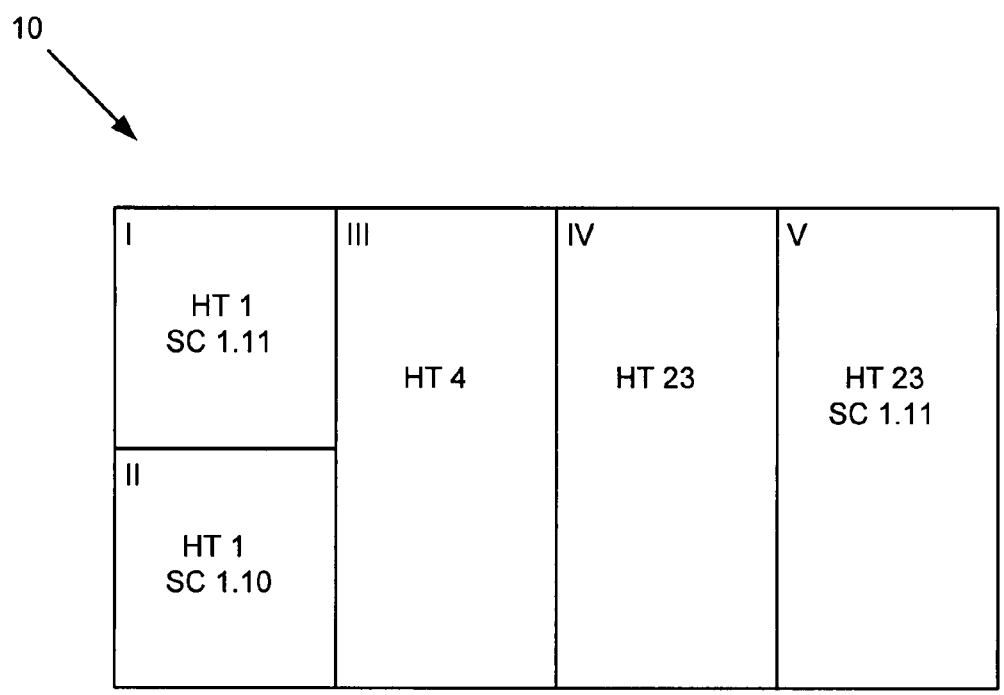
FIG. 1 is a schematic diagram of a site map of a proposed development site defining individual map units corresponding to certain habitat types and structural conditions.

Disclosed herein are exemplary embodiments of methods, apparatus, and systems for assessing habitat value that should not be construed as limiting in any way. Instead, the present disclosure is directed toward all novel and nonobvious features and aspects of the various disclosed methods, apparatus, and systems, alone and in various combinations and subcombinations with one another. The disclosed technology is not limited to any specific aspect or feature described, or combination thereof, nor do the disclosed methods, apparatus, and systems require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may be rearranged or performed concurrently.

The disclosed embodiments can be implemented in a wide variety of environments. For example, the disclosed analysis techniques can be implemented at least in part as software comprising computer-executable instructions stored on one or more computer-readable media (for example, one or more CDs, volatile memory components (such as DRAM or SRAM), or nonvolatile memory components (such as hard drives)). Such software may comprise, for example, a software tool used to assess habitat value. This particular software implementation should not be construed as limiting in any way, however, as the principles disclosed herein are generally applicable to other software tools.

Any such software can be executed on a single computer or on a networked computer (for example, via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For the same reason, computer hardware for executing the software implementations is not described in further detail. Any of the disclosed methods can alternatively be implemented (partially or completely) in hardware (for example, an ASIC, PLD, or SoC).

Results produced from any of the disclosed methods can be created, updated, or stored on one or more computer-readable media, volatile memory components, or nonvolatile memory components using a variety of different data structures or formats. For example, a data structure comprising habitat values, debits, and/or credits determined by the application of any of the disclosed embodiments may be stored on computer readable-media. Such diagnostic results can be created or updated at a local computer or over a network (for example, by a server computer).

Figure 4:
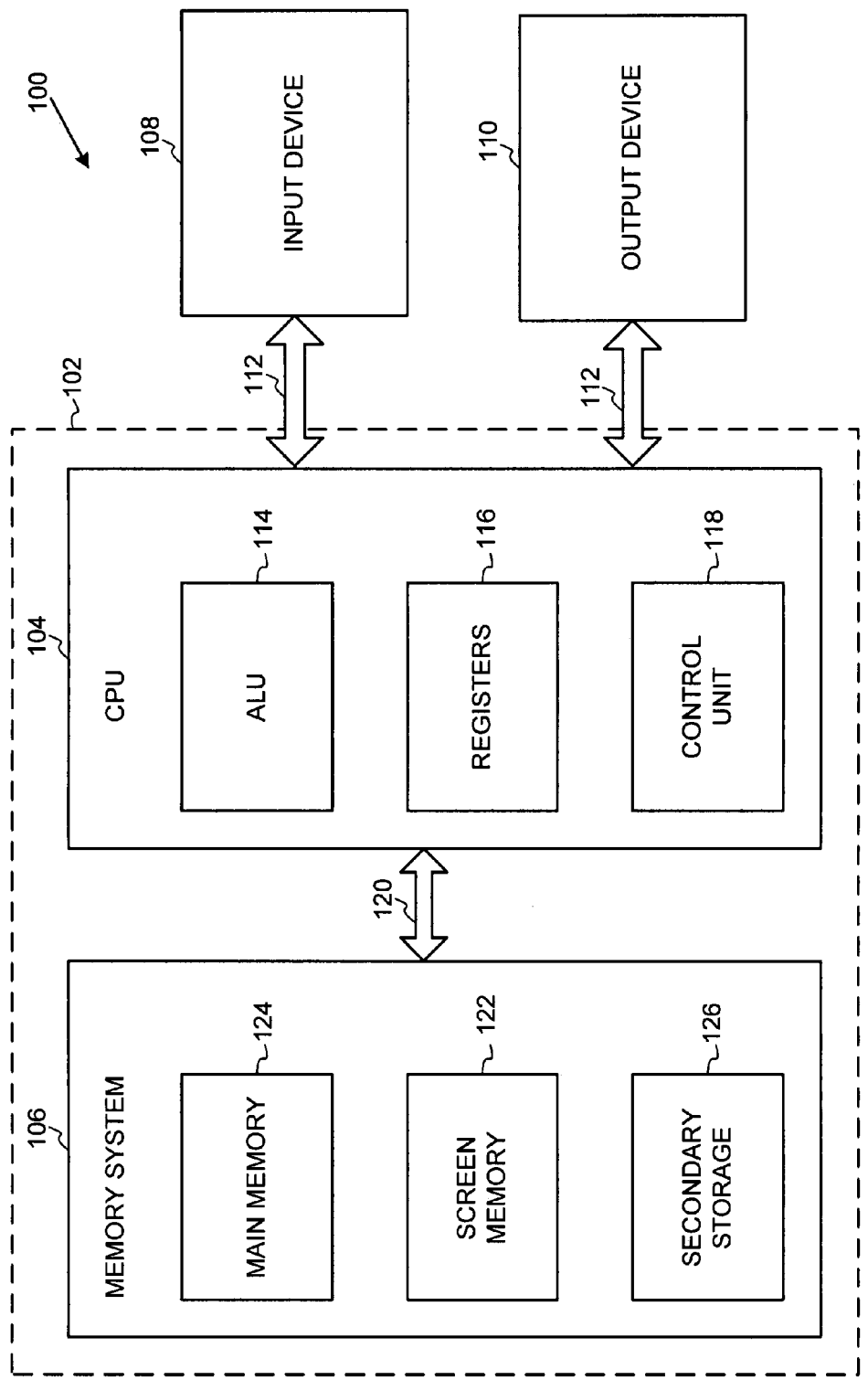
FIG. 4 is a block diagram of an exemplary operating environment for performing embodiments of the disclosed methods.

Referring to FIG. 4, an exemplary operating environment for performing embodiments of the disclosed methods is a computer system 100 with a computer 102 that comprises at least one high speed processing unit (CPU) 104, in conjunction with a memory system 106, an input device 108, and an output device 110. These elements are interconnected by at least one bus structure 112. Multiprocessor systems can also be used.

The illustrated CPU 104 is of familiar design and includes an ALU 114 for performing computations, a collection of registers 116 for temporary storage of data and instructions, and a control unit 118 for controlling operation of the system 100. The CPU 104 may be a processor having any of a variety of architectures now known or contemplated in the art.

The memory system 106 generally includes high-speed main memory 124, which has the form of a compute-readable medium such as random access memory (RAM) and read only memory (ROM) semiconductor devices, and secondary storage 126, which has the form of long-term computer-readable media such as floppy disks, hard disks, tape, CD-ROM, flash memory, and other devices that store data using electrical, magnetic, optical, or other recording media. The memory system 106 also can include video display memory, also known as screen memory 122, for displaying images through a display device. Those skilled in the art will recognize that the memory system 106 can comprise a variety of alternative components having a variety of storage capacities.

The input and output devices 108, 110 also are familiar. The input device 108 can comprise a keyboard, a mouse, a physical transducer (e.g., a microphone) and the like. The output device 110 can comprise a display, a printer, a transducer (e.g., a speaker), and the like. Some devices, such as a network interface or a modem, can be used as input and/or output devices.

As is known to those skilled in the art, the computer system 100 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 106.

In accordance with the practices of persons skilled in the art of computer programming, aspects of the disclosed technology are described below with reference to acts and symbolic representations of operations that can be performed by the computer system 100. Such acts and operations are referred to as being computer-executed or computer-implemented. It will be appreciated that the acts and symbolically represented operations include the manipulation by the CPU 104 of electrical signals representing data bits. This manipulation causes a resulting transformation or reduction of the electrical signal representation of data bits at memory locations in memory system 106 to thereby reconfigure or otherwise alter the computer system's operation, as well as other processing of signals. The memory locations where data bits are maintained are physical locations that have particular electrical, magnetic, or optical properties corresponding to the data bits.

INTRODUCTION

The present disclosure concerns an "accounting" system for quantifying or assigning values to habitats and/or species. In particular embodiments, the system can be used to determine the current habitat value a proposed development site, the future habitat value of the site, impacts (debits) to the site, and/or offsets (credits). By evaluating and assessing such values associated with a proposed development site, the chances of long-term ecological success can be greatly increased.

DEFINITIONS

As used herein, the term "habitat type" refers to a group of vegetation cover types or land use/land cover types. Knowledge of the habitat type of an area can be used predict a list of species that may be found in that area. Appendix A provides an exemplary list of several habitat types identified for the Pacific Northwest.

As used herein, the term "structural conditions" refers to specific characteristics of vegetation occurring within a habitat type. Structural conditions can be divided into four major categories: forest, shrubland/grassland, agriculture, and urban. The existence of certain structural conditions within a habitat type can predispose a species to use an area. Appendix B provides an exemplary list of various structural conditions.

As used herein, the term "key environmental correlates" or "key ecological correlates" (KEC) refers to site-specific components of the environment believed to most influence wildlife species' distribution, abundance, fitness, and viability. KECs can include natural attributes, both biological and physical (e.g., large trees, woody debris, cliffs, and soil characteristics) as well as anthropogenic features and their effects such as roads, buildings, and pollution. KECs reflect the quality of the habitat. Appendix C provides an exemplary list of various KECs that may be found in different habitat types.

The term "key ecological functions" (KEF) typically is used to refer to the principal set of ecological roles performed by each species in its ecosystem; that is, the main ways organisms use, influence, and alter their biotic and abiotic environments. Many examples of KEFs can be found in the literature. In the context of the present application, KEFs more generally refer to functional categories of KEFs. Appendix D provides an exemplary classification system identifying various KEFs.

As used herein, the term "invasive species" refers to non-native plant species occurring within a site.

As used herein, the term "Ecoprovince" refers to a third-field Hydrologic Unit Code.

Baseline Habitat Values

Quantifying the value of natural habitats of a geographic area involves calculating a "baseline habitat value" for the site. Two approaches for calculating the baseline habitat value, namely, the "full assessment method" and the "intermediate assessment method," are described in detail below. The full assessment method provides for a more accurate evaluation of an area than the intermediate assessment method. The latter method typically is used where a relatively quick assessment is required.

Full Assessment Method

The full assessment method can be used to determine the baseline habitat value of sites and the anticipated post-project habitat value of impact sites. The resultant baseline habitat value can be used to determine debit or credit values, as further described below. The full assessment method generally involves conducting a field inventory of the natural habitats of a site, use habitat databases to develop metrics describing species, habitat associations, and function within the site, and using Geographic Information Systems (GIS) to determine the extent of habitat types within the site and their associated habitat value.

The initial step in determining a baseline habitat value for a site involves creating a potential species list for the site by evaluating the habitat types, structural conditions, and key environmental correlates (KECs) that are recorded and mapped during a field inventory of the site. An exemplary approach for mapping a site involves identifying the various habitat types within the site and the structural conditions, if any, within each habitat type. "Map units" are then defined by delineating or drawing boundaries around each habitat type (if the habitat includes only one or no identifiable structural conditions) or each structural condition within a habitat type (if a habitat type includes more than one structural condition). The acreage of each map unit and each habitat type within the site and the number of KEFs for each map unit are determined for use in calculating the baseline habitat value for each map unit and the entire site.

FIG. 1 is a schematic illustration of a site 10 divided into five map units I-V classified according to the habitat types and structural conditions provided in Appendices A and B. In this example, map unit I includes habitat type 1 (westside lowland conifer-hardwood forest) containing structural condition (medium tree-single story-closed); map unit II includes habitat type 1 containing structural condition 1.8 (small tree-single story-closed); map unit III includes habitat type 4 (montane mixed conifer forest); map unit IV includes habitat type 23 (westside riparian-wetlands); and map unit V includes habitat type 1 containing structural condition 1.11. In some instances, map units I and II, which contain the same habitat type and structural condition, can be considered as a single map unit for purposes of calculating the baseline habitat value of the entire site. However, where map units contain the same habitat type and structural condition but are separated by another habitat type or a natural or man-made barrier (e.g., a road) that would prohibit interaction between the similar map units on an ecological basis, it is more desirable to consider each map unit separately when calculating the baseline habitat value for the site.

From the field inventory of the site, data sets of structural conditions and KECs for each map unit are created. These consolidated data sets can then be used to query electronic habitat databases for correlations between habitat types, structural conditions and KECs and species to create a potential species list. One such database for the states of Oregon and Washington is available from the Northwest Habitat Institute (NHI) (Corvallis, Oreg.). This database cross-references species of vertebrate animals with the habitat types, structural conditions, KECs, and KEFs identified in Appendices A-D. The creation of this database is described in detail in Johnson et al., WILDLIFE-HABITAT RELATIONSHIPS IN OREGON AND WASHINGTON, Oregon State University Press, 2001, which is incorporated herein by reference. Similar databases can be created for species found in other geographic areas and/or for invertebrate species. In other embodiments, other sources of information or other techniques or methods can be used to generate a potential species list.

If desired, the potential species list can be reviewed to assess possible errors of omission (species thought to be present on the site but absent from the list) or commission (species thought to be absent from the site but included on the list). The review of the species list is intended to identify species that are associated with existing habitat characteristics but whose presence on the site is made unlikely due to connectivity barriers (such as poorly designed culverts or highways and associated traffic), habitat fragmentation (when the extent of habitat patches is insufficient to support a given species), and/or adjacent land use (activities that affect the suitability of adjacent habitats).

Associations between individual species and key ecological functions (KEFs) are used to generate a list of potential KEFs that may be present in each map unit. For each KEF present, these associations also can be used to determine the number of species perform that KEF (i.e., to determine the functional redundancy of each habitat types).

The extent of habitat types can be expressed both in terms of acreage and in terms of proportion (percentage) of the entire site. The extent of individual map units also can be calculated, both in terms of acreage and in terms of proportion of the total extent of the habitat type with which it is associated.

The species and function metrics and the extent of habitat types can be used to assess the potential overall habitat value for a site. The potential habitat value can be subsequently adjusted to account for invasive species and to determine the baseline habitat value, as described below. An exemplary method 20 for calculating the potential habitat value for a site and for individual map units within the site is summarized in FIG. 2.

Figure 2:
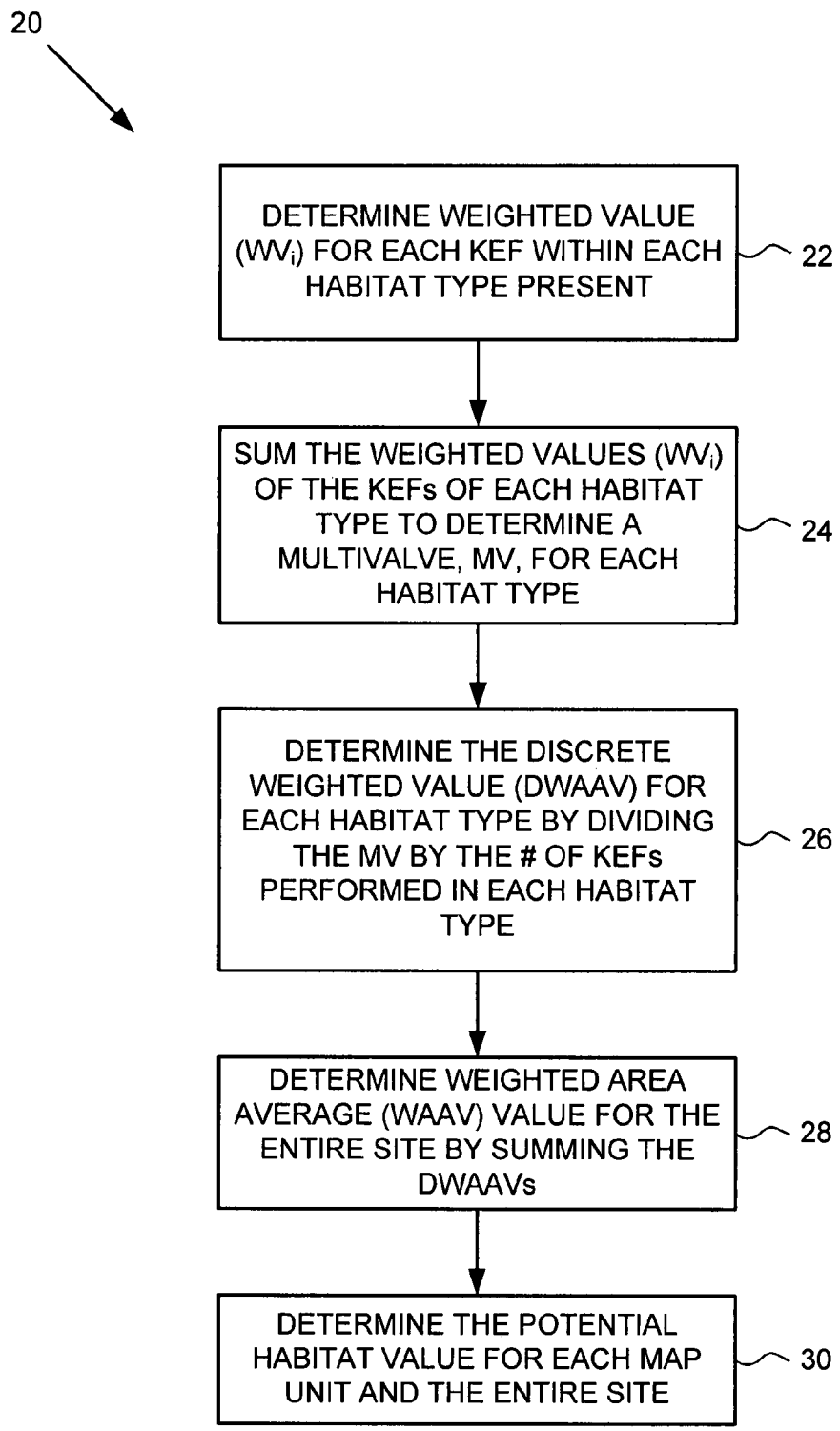
FIG. 2 is a flowchart describing a method for determining the habitat value of an entire site and individual map units within the site, according to one specific embodiment.

First, as indicated at 22 in FIG. 2, a weighed species value for each KEF within each habitat type present is calculated by multiplying the number of species performing that KEF by the percentage of the total site acreage occupied by that habitat type:

$$WV_i = S_i \times (A_H/A_S) \quad \text{(Equation 1)},$$

where $WV_i$ is the weighted species value for KEF i in the given habitat type, $S_i$ is the number of species performing KEF i, $A_H$ is the area, in acres, of the given habitat type, and $A_S$ is the area, in acres, of the entire site.

Second, a functional capacity value, or a species functional redundancy value, is determined for each habitat type based on the ecological functions of the habitat. This can be determined by calculating a species multivalue, SMV, for each habitat type equal to the sum of the weighted species value, $WV_i$, for each KEF, as expressed in Equations 2a and 2b (as indicated at 24 in FIG. 2). The species multivalue reflects the extent and functional capacity of each habitat type.

$$SMV = \Sigma(WV) \quad \text{(Equation 2a)}$$

or $$SMV = [\Sigma(S_i)] \times (A_H/A_S) \quad \text{(Equation 2b)}$$

where SMV is the species multivalue for the given habitat type, $WV_i$ is the weighted species value for KEF i in the given habitat type, $S_i$ is the number of species performing KEF i, $A_H$ is the area, in acres, of the given habitat type, and $A_S$ is the area, in acres, of the entire site.

Third, as indicated at 26 in FIG. 2, the discrete weighted area average species value (DWAASV) for each habitat type is calculated by dividing the multivalue, SMV, of the habitat type by the number of KEFs performed in that habitat type:

$$DWAASV = SMV/n \quad \text{(Equation 3)},$$

where DWAASV is the discrete weighted area average species value for the given habitat type, SMV is the species multivalue for the given habitat type, and n is the number of KEFs performed in the given habitat type.

The weighted area average value represents the average functional capacity of the KEFs associated with the habitat type, or the habitat value for the habitat type. The term "discrete" is applied to indicate that the value applies to a given habitat type, rather than the site as a whole.

Fourth, as indicated at 28 in FIG. 2, the composite weighted area average species value (WAASV) across the entire site is calculated by summing the DWAASVs from multiple habitat types, as expressed in Equation 4 below. The WAASV for a given site can be calculated for focal habitat types only (habitats in decline) (FWAASV), natural habitat types only (NWAASV), or all habitat types (AWAASV). The WAASV represents the per-acre Habitat Value of the entire site, weighted by habitat type area.

$$WAASV = \Sigma(DWAASV) \quad \text{(Equation 4)},$$

where WAASV is the weighted area average species value for the site, and

DWAASV is the discrete weighted area average species value for the given habitat type.

Fifth, as indicated at 30 in FIG. 2, the WAASV is multiplied by the acreage of associated habitat types to determine the potential habitat value for the entire site (Equation 5a). The potential habitat value can be calculated for focal habitat types only, natural habitat types only, or all habitats. The potential habitat value for the entire site can be allocated to individual map units. This can be accomplished by multiplying the DWAASV for the associated habitat type by the area of the map unit, then dividing by the proportional extent of the habitat type (Equation 5b). This allocation allows for adjustment of the habitat value within individual map units to account for the presence of invasive species, as described below.

$$V^*_S = WAASV \times A_S \quad \text{(Equation 5a)},$$

$$V^*_M = (DWAASV \times A_M)/(A_H/A_S) \quad \text{(Equation 5b)}.$$

where WAASV is the weighted area average species value for the site,

DWAASV is the discrete weighted area average species value for the given habitat type, $V^*_S$ is the potential habitat value for the site, $V^*_M$ is the potential habitat value for the map unit, $A_M$ is the area of the given map unit, $A_H$ is the area, in acres, of the given habitat type, and $A_S$ is the area, in acres, of the entire site.

The potential habitat value for each map unit desirably is adjusted to account for the adverse impacts of invasive plant species on species and functions due to the fact that the un-adjusted habitat value assumes that habitat conditions are at their ecological potential. In particular embodiments, the potential habitat value is adjusted by deriving an invasive species factor (ISF) for each map unit from the cover of invasive plant species in each of three structural layers (grass/forbs, shrubs, and trees) (Table 1). This data is collected for all map units, although one or more structural layers may be absent from a given map unit.

An aggregate invasive species factor can be determined, for example, by taking the geometric mean of the adjustment factors for each structural layer present within the map unit (Equation 6). The geometric mean preferably is used, rather than arithmetic mean, because it is less sensitive to large outliers (i.e., the geometric mean is substantially less than the arithmetic mean for positively skewed samples). The geometric mean therefore results in lower aggregate invasive species factors in situations in which one structural layer has no invasives but the other two structural layers are dominated by invasives.

The minimum value of the aggregate invasive species factor in Table 1 is 0.6. This value was determined by comparing the mean functional redundancy index (MFRI) for each habitat type (discussed below) and calculating the ratio between the highest anthropogenic MFRI and the lowest natural habitat type MFRI in each Ecoprovince. This specific value for the minimum invasive species factor was selected to ensure that natural habitat types would not be predisposed to have lower habitat values than urban or agricultural areas. The invasive species factor for map units with no structural layers (e.g., certain open water habitats) and for Urban and Agricultural habitat types is 1.0.

TABLE 1

Adjustment factors applied to each structural layer present in a map unit.

| Percent Areal Cover of Invasive Species in Structural Layer | Invasive Species Factor for Structural Layer |
|---|---|
| 0-10% | 1.0 |
| 11-35% | 0.9 |
| 36-65% | 0.8 |
| 66-90% | 0.7 |
| >90% | 0.6 |

One structural layer present in map unit:

$$F_S = f_1 \quad \text{(Equation 6a)},$$

Two structural layers present in map unit:

$$F_S = (f_1 \times f_2)^{1/2} \quad \text{(Equation 6b)},$$

Three structural layers present in map unit:

$$F_S = (f_1 \times f_2 \times f_3)^{1/3} \quad \text{(Equation 6c)},$$

where $F_S$ is the aggregate Invasive Species Factor for the given map unit, and $f_1$, $f_2$, and $f_3$ are the Invasive Species Factor associated with each structural layer present in the map unit.

The adjusted habitat value for each map unit (or GIS polygon) can then be calculated by multiplying the potential habitat value by the aggregate invasive species factor:

$$V_M = V^*_M \times F_S \quad \text{(Equation 7a)}$$

or $$V_M = (DWAASV \times A_M \times F_S)/(A_H/A_S) \quad \text{(Equation 7b)},$$

where $V_M$ is the habitat value for the given map unit, $V^*_M$ is the potential habitat value for the map unit, $F_S$ is the Invasive Species Factor for the given map unit, DWAASV is the discrete weighted area average species value for the given habitat type, $A_M$ is the area of the given map unit, $A_H$ is the area, in acres, of the given habitat type, and $A_S$ is the area, in acres, of the entire site.

The normalized habitat value for each map unit can be determined by dividing the habitat value by the map unit area (in acres). Finally, the adjusted habitat value for the entire site can be calculated by summing the habitat values for the individual map units.

In Equations 1-7, the number of species is valued equally to the number of KEFs in each habitat type. Thus, the addition of a species will increase the species multivalue, SMV, by the same amount as the addition as a KEF. In an alternative embodiment, Equations 3-7 can be modified to obtain a habitat value that better reflects the diversity of species and KEFs within each habitat type. For example, Equation 3 can be modified by multiplying the product SMV/n by the number of species:

$$DWAASV' = S_t \times SMV/n \quad \text{(Equation 8)},$$

where DWAASV' is a discrete weighted area average species value for the given habitat type, $S_t$ is the total number of species existing in the given habitat type, SMV is the species multivalue for the given habitat type, and n is the number of KEFs performed in the given habitat type.

The DWAASV' values the number of species more heavily than the number of KEFs. Thus, a first habitat having a greater number of species but otherwise having the same functional capacity value, SMV, as a second habitat, will have a greater DWAASV' than the second habitat. The greater value accounts for the fact that the first habitat has a greater diversity of species than the second habitat. Similarly, Equation 4 can be modified for calculating a weighted area average species value:

$$WAASV' = \Sigma(DWAASV') \quad \text{(Equation 9)},$$

where WAASV' is the weighted area average species value for the site, and DWAASV' is the discrete weighted area average species value for the given habitat type.

In Equations 5a and 5b, WAASV and DWAASV can be replaced with WAASV' and DWAASV', respectively, to calculate a potential habitat value for the site, referred to as $V^*_S{}'$, and a potential habitat value for a given map unit, referred to as $V^*_M{}'$:

$$V^*_S{}' = WAASV' \times A_S \quad \text{(Equation 10a)},$$

$$V^*_M{}' = (DWAASV' \times A_M)/(A_H/A_S) \quad \text{(Equation 10b)},$$

Similar to Equations 7a and 7b, $V^*_M{}'$ can be adjusted to account for invasive species according to Equations 11a and 11b below.

$$V_M{}' = V^*_M{}' \times F_S \quad \text{(Equation 11a)}$$

or $$V_M{}' = (DWAASV' \times A_M \times F_S)/(A_H/A_S) \quad \text{(Equation 11b)},$$

where $V_M{}'$ is the habitat value for the given map unit, $V^*_M{}'$ is the potential habitat value for the map unit, $F_S$ is the Invasive Species Factor for the given map unit, DWAASV' is the discrete weighted area average species value for the given habitat type, $A_M$ is the area of the given map unit, $A_H$ is the area, in acres, of the given habitat type, and $A_S$ is the area, in acres, of the entire site.

The adjusted habitat value for the entire site can be calculated by summing the habitat values ($V_M{}'$) for the individual map units.

Habitat values obtained using Equations 1-11 are based on functional redundancy values of the habitats that reflect the number of species-function relationships within a given habitat type (the occurrences of KEFs in a habitat type). Similar calculations can be made based on functional redundancy values that reflect the number of KECs (Key Environmental Correlates) associated with each KEF within a given habitat type to determine "correlate" values for an entire site and/or for each map unit within a site. In particular, a correlate multivalue CMV for each habitat based on the number of correlate-function relationships, rather than the number of species-function relationships, can be initially determined by substituting $\Sigma(S_i)$ (the total number of species-function relationships in a given habitat type) in Equation 2b with $\Sigma(C_i)$ (the total number of correlate-function relationships in a given habitat type) in order to determine a correlate multivalue CMV for each habitat based on the correlate functional redundancy of the habitat. Using this multivalue for the correlates, potential and adjusted habitat values can be determined using Equations 3-7 or Equations 8-11. If Equation 8 is used to determine discrete weighted area average values for each habitat, $S_t$ (the total number of species existing in a given habitat) is substituted with $C_t$ (the total number of correlates in a given habitat).

The habitat value based on the species functional redundancy determined by Equations 1-11 can be referred to as the "species" value for a site and the habitat value based on the correlate functional redundancy can be referred to as the "correlate" value for the site. A habitat value giving weight to both the species functional redundancy and the correlate functional redundancy can be determined for example, by averaging or summing the species value and the correlate value for the site. Alternatively, these two values can be recorded separately rather than combining them into a single habitat value. An exemplary method 50 for calculating the potential habitat value for a site and for individual map units incorporating the species functional redundancy and the correlate functional redundancy is summarized in FIG. 3.

Figure 3:
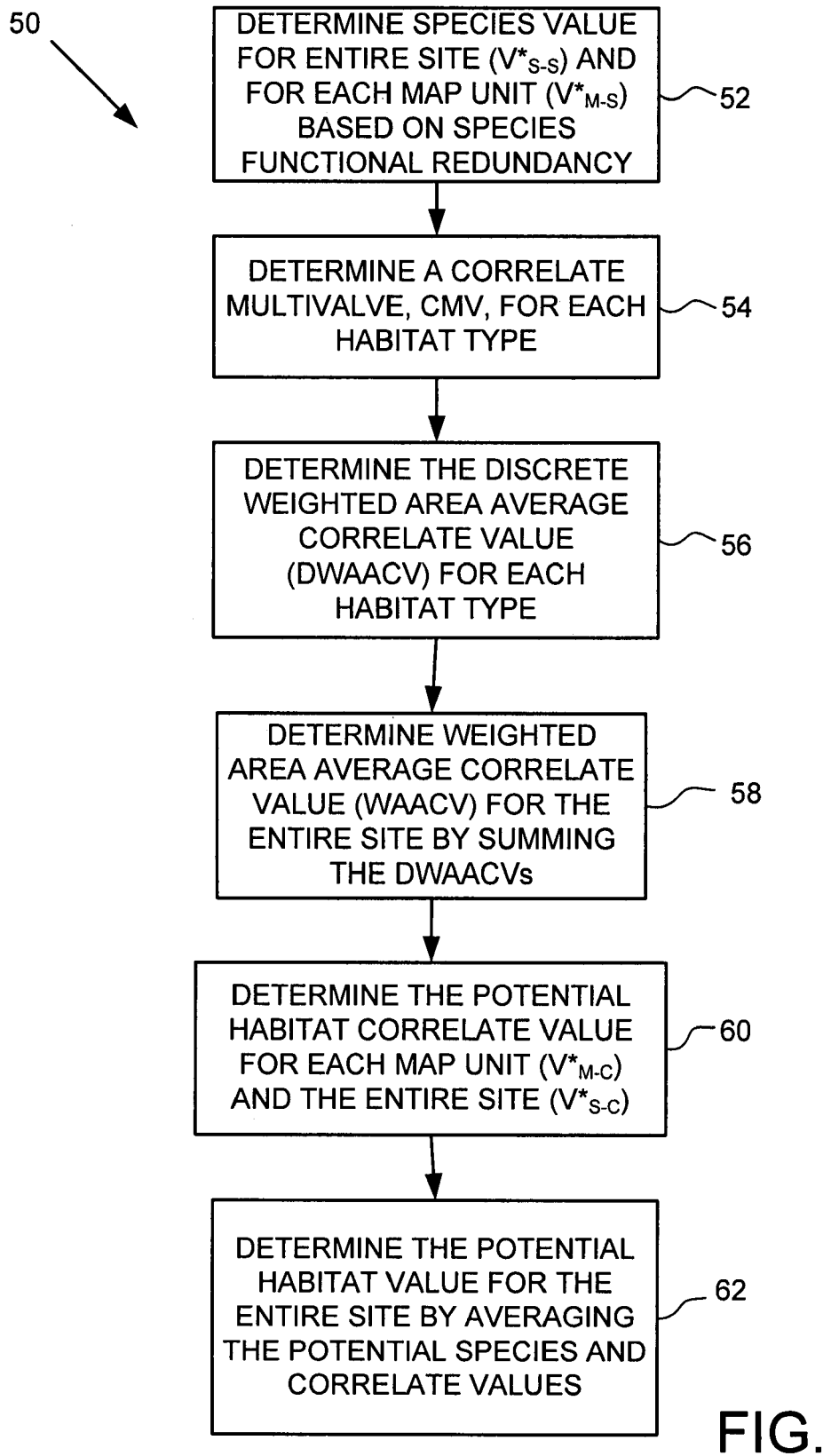
FIG. 3 is a flowchart describing a method for determining the habitat value of an entire site and individual map units within the site, according to another embodiment.

First, as indicated at 52 in FIG. 3, the potential "species" value for each map unit and an entire site based on the species functional redundancy of each habitat type is determined. This can be accomplished as described above using Equations 1-5. The values obtained using Equations 5a and 5b can be renamed $V^*_{S\text{-}S}$ and $V^*_{M\text{-}S}$ to indicate that the calculations are based on the species functional redundancy in each habitat type.

Second, as indicated at 54 in FIG. 3, the correlate functional redundancy for each habitat type can be determined by calculating a correlate multivalue for each habitat type, CMV, in accordance with Equation 10 below.

$$CMV = [\Sigma(C_i)] \times (A_H/A_S) \quad \text{(Equation 12)}$$

where CMV is the correlate multivalue for the given habitat, $C_i$ is the total number of correlate-function relationships for the given habitat type (the number of occurrences of KECs in the habitat type), $A_H$ is the area, in acres, of the given habitat type, and $A_S$ is the area, in acres, of the entire site.

Third, as indicated at 56 in FIG. 3, the Discrete Weighted Area Average Correlate Value (DWAACV) for each habitat type is calculated by dividing the correlate multivalue, CMV, of the habitat type by the number of KEFs performed in that habitat type:

$$DWAACV = CMV/n \quad \text{(Equation 13)},$$

where DWAACV is the discrete weighted area average correlate value for the given habitat type, CMV is the correlate multivalue for the given habitat type, and n is the number of KEFs performed in the given habitat type.

Fourth, as indicated at 58 in FIG. 3, the composite weighted area average correlate value (WAACV) across the entire site is calculated by summing the DWAACVs from multiple habitat types, as expressed in Equation 14 below. The WAACV for a given site can be calculated for focal habitat types only (habitats in decline) (FWAACV), natural habitat types only (NWAACV), or all habitat types (AWAACV).

$$WAACV = \Sigma(DWAACV) \quad \text{(Equation 14)},$$

where WAACV is the weighted area average correlate value for the site, and

DWAACV is the discrete weighted area average correlate value for the given habitat type.

Fifth, as indicated at 60 in FIG. 3, the WAACV is multiplied by the acreage of associated habitat types to determine the potential correlate value for the entire site (Equation 15a). The potential correlate value can be calculated for focal habitat types only, natural habitat types only, or all habitats. The potential correlate value for the entire site can be allocated to individual map units. This can be accomplished by multiplying the DWAACV for the associated habitat type by the area of the map unit, then dividing by the proportional extent of the habitat type (Equation 15b). This allocation allows for adjustment of the correlate value within individual map units to account for the presence of invasive species, as described below.

$$V^*_{S-C} = WAACV \times A_S \qquad \text{(Equation 15a)},$$

$$V^*_{M-C} = (DWAACV \times A_M)/(A_H/A_S) \qquad \text{(Equation 15b)},$$

where WAACV is the weighted area average correlate value for the site,

DWAACV is the discrete weighted area average correlate value for the given habitat type, $V^*_{S-C}$ is the potential correlate value for the site, $V^*_{M-C}$ is the potential correlate value for the map unit, Sixth, as indicated at 62 in FIG. 3, the potential habitat value for the entire site can be determined by averaging the potential species values and the potential correlate values:

$$PHV_S = (V^*_{S-S} + V^*_{S-C})/2 \qquad \text{(Equation 16)},$$

where $PHV_S$ is the potential habitat value for the entire site.

Alternatively, the habitat value for the site can be obtained by summing $V^*_{S-S}$ and $V^*_{S-C}$. Also, the habitat value can be reported on a per acre basis, such as by dividing the habitat value for the site by the number of acres in the entire site. Further, rather than calculating a single value incorporating the species value and the correlate value for the site, these two values can be recorded as separate baseline values for the site.

The potential habitat value $PHV_S$ can be adjusted to account for invasive species according to Equations 17a-17c below. In Equation 17a, the species value of each map unit is multiplied by the invasive species factor $F_S$ of the map unit to obtain an adjusted species value for the map unit, and the adjusted species values for each map unit are summed to obtain an adjusted species value ASV for the entire site. Similarly, in Equation 17b, the correlate value of each map unit is multiplied by the invasive species factor $F_S$ of the map unit to obtain an adjusted correlate value for the map unit, and the adjusted correlate values for each map unit are summed to obtain an adjusted correlate value ASC for the entire site. The habitat value HV for the entire site can be obtained by averaging ASV and ASC (Equation 17c) or by summing ASV and ASC.

$$ASV = \Sigma(DWAASV \times A_M \times F_S)/(A_H/A_S) \qquad \text{(Equation 17a)},$$

where ASV is the adjusted species value for the entire site, $$ASC = \Sigma(DWAACV \times A_M \times F_S)/(A_H/A_S) \qquad \text{(Equation 17b)},$$

where ACV is the adjusted correlate value for the entire site, $$HV = (ASV + ASC)/2 \qquad \text{(Equation 17c)},$$

where HV is the adjusted habitat value for the entire site.

In another embodiment, species values for the entire site and individual map units can be determined using Equations 8-10. $V^*_S{}'$ (Equation 10a) and $V^*_M{}'$ (Equation 10b) can be renamed $V^*_{S-S}{}'$ and $V^*_{M-S}{}'$ to indicate that the calculations are based on species functional redundancy. Similar calculation can be made to determine correlate values using Equations 18-21 below. First, the discrete weighted area average correlate value for each habitat type is determined by the following equation:

$$DWAACV' = C_t \times CMV/n \qquad \text{(Equation 18)},$$

where DWAASV' is a discrete weighted area average correlate value for the given habitat type, $C_t$ is the total number of correlates existing in the given habitat type, CMV is the correlate multivalue for the given habitat type, and n is the number of KEFs performed in the given habitat type.

Second, the composite weighted area average correlate value, WAACV', can be determined by the equation:

$$WAACV' = \Sigma(DWAACV') \qquad \text{(Equation 19)},$$

Third, the potential correlate values for the entire site and each map unit can be determined by the equation:

$$V^*_{S-C}{}' = WAACV' \times A_S \qquad \text{(Equation 20a)},$$

$$V^*_{M-C}{}' = (DWAACV' \times A_M)/(A_H/A_S) \qquad \text{(Equation 20b)},$$

$V^*_{S-C}{}'$ is the potential correlate value for the site, $V^*_{M-C}{}'$ is the potential correlate value for a given map unit, Fourth, the potential habitat value for the entire site can be determined by averaging the potential species values and the potential correlate values:

$$PHV_S{}' = (V^*_{S-S}{}' + V^*_{S-C}{}')/2 \qquad \text{(Equation 21)},$$

where $PHV_S{}'$ is the potential habitat value for the entire site.

Finally, the potential habitat value can be adjusted to account for invasive species:

$$ASV' = \Sigma(DWAASV' \times A_M \times F_S)/(A_H/A_S) \qquad \text{(Equation 22a)},$$

where ASV' is the adjusted species value for the entire site, $$ASC' = \Sigma(DWAACV' \times A_M \times F_S)/(A_H/A_S) \qquad \text{(Equation 22b)},$$

where ACV' is the adjusted correlate value for the entire site, $$HV' = (ASV' + ASC')/2 \qquad \text{(Equation 22c)},$$

where HV' is the adjusted habitat value for the entire site.

The embodiments of the full assessment method described above can be implemented (as well as the other methods disclosed herein) as a software program executed on a computer (e.g., computer 102 in FIG. 4). In one implementation, for example, all data collected from a field survey, including the area of the entire geographic site, the area of each map unit within the site, the area of each habitat type within the site, the number of KEFs performed in each habitat type, the number of species performing each KEF in each habitat type, and the number of structural layers present in each map unit, is inputted or retrieved from a previously saved data file. Based on the collected data, the program calculates the baseline habitat value for the entire site and each map unit, as well as the adjusted habitat value for the entire site and each map unit using Equations 1-7.

Intermediate Assessment Method

The Intermediate Assessment Method alternatively can be used for determining the pre-project and anticipated post-project value of certain impact sites where a quicker yet less accurate assessment is appropriate. The Intermediate Assessment Method uses "mean functional redundancy index" (MFRI) values that have been developed for each habitat type in each Ecoprovince. Table 2 below provides such values for various Ecoprovinces in the Pacific Northwest. These values reflect the cumulative number of species performing each KEF divided by the number of KEFs performed in that map unit, and were derived from habitat database queries (Equation 23). In other words, the MFRI value for a given habitat type reflects the mean number of species performing each KEF. The Intermediate Assessment Method does not involve expert review of species lists (since none are generated).

$$I_F = [\Sigma(S_i)]/n \quad \text{(Equation 23)},$$

where $I_F$ is the mean functional redundancy index for the given habitat type, $S_i$ is the number of species performing KEF i, and n is the number of KEFs performed in the given habitat type.

The MFRI is determined on an Ecoprovince basis, and is therefore likely to overestimate the number of species and KEFs present in any given map unit. This is because many species that are associated with a given habitat type in a given Ecoprovince may not be found in highly localized impact areas which are often fragmented, disturbed, or otherwise lacking in KECs. Accordingly, such overestimates can be addressed with factors that account for anthropogenic impacts and adjacent land use (Tables 3 and 4 below provide such values for Pacific Northwest Ecoprovinces). These factors are used to reduce the MFRI commensurate with the level of habitat disturbance and fragmentation. The adjacent land use factor is considered only for natural habitat types (i.e., it always has a value of 1.0 for urban and agricultural habitat types).

TABLE 2

Estimated Mean Functional Redundancy Index for habitat types and Ecoprovinces (derived from NHI analysis).

| Habitat type | Ecoprovince | | | | | |
| --- | --- | --- | --- | --- | --- | --- |
| | S. OR Coast | N. OR Coast | Lower Columbia | Mid Columbia | Willamette | Klamath |
| Westside Lowlands Conifer-Hardwood Forest | 19.4 | 17.5 | 18.3 | 15.2 | 18.4 | |
| Westside Oak & Douglas-fir Forest & Woodlands | 19.6 | 16.7 | 18.0 | 15.9 | 18.0 | 18.3 |
| Southwest Oregon Mixed Conifer-Hardwood Forest | 21.2 | 17.3 | | | 18.7 | 20.0 |
| Montane Mixed Conifer Forest | 16.1 | | 14.1 | 14.0 | 14.6 | 16.1 |
| Eastside Mixed Conifer Forest | 17.0 | | | 16.3 | | 18.2 |
| Lodgepole Pine Forest and Woodlands | 12.3 | | | 12.9 | | 13.6 |
| Ponderosa Pine Forest and Woodlands | 17.7 | | | 17.8 | 16.0 | 19.5 |
| Upland Aspen Forest | | | | | | |
| Subalpine Parklands | 13.8 | | 12.6 | 14.0 | 13.0 | 14.7 |
| Alpine Grasslands and Shrublands | 9.9 | | 8.8 | 10.5 | 9.3 | 10.9 |
| Westside Grasslands | | | | | 13.1 | |
| Ceanothus/Manzanita Shrublands | 13.1 | | | | | 12.4 |
| Western Juniper and Mtn. Mahogany Woodlands | | | | 13.2 | | 13.9 |
| Eastside Canyon Shrublands | | | | 12.1 | | |
| Eastside Grasslands | 11.4 | | | 16.1 | | 15.6 |
| Shrub Steppe | | | | 14.8 | | 15.0 |
| Dwarf Shrub Steppe | | | | | | 11.9 |
| Desert Playa and Salt Scrub | | | | | | |
| Agriculture Pasture and Mixed Environs | 4.6 | 4.6 | 4.8 | 5.6 | 4.7 | 5.9 |
| Urban and Mixed Environs | 3.6 | 3.6 | 4.0 | 3.3 | 4.0 | 2.9 |
| Open Water | 20.2 | 25.6 | 27.5 | 26.1 | 22.0 | 20.2 |
| Herbaceous Wetlands | 13.5 | 11.3 | 12.7 | 14.7 | 12.8 | 17.4 |
| Westside Riparian/Wetlands | 20.1 | 17.6 | 19.6 | | 19.9 | 19.0 |
| Montane Coniferous Wetlands | 12.0 | | 10.9 | 11.3 | 11.3 | 12.4 |
| Eastside Riparian/Wetlands | | | | 20.7 | | 21.7 |
| Coastal Dunes and Beaches | 9.9 | 9.6 | 10.6 | | | |
| Coastal Headlands and Islets | 9.0 | 8.8 | 9.3 | | | |
| Bays and Estuaries | 15.0 | 15.0 | 15.2 | | | |

| Habitat type | Ecoprovince | | | | | |
| --- | --- | --- | --- | --- | --- | --- |
| | Deschutes | John Day | OR Closed Basins | Mid. Snake/Boise | Mid Snake/Powder | Lower Snake |
| Westside Lowlands Conifer-Hardwood Forest | 16.8 | | | | | |
| Westside Oak & Douglas-fir Forest & Woodlands | | | | | | |
| Southwest Oregon Mixed Conifer-Hardwood Forest | 18.4 | | | | | |
| Montane Mixed Conifer Forest | 16.1 | 13.6 | 13.8 | 12.9 | 14.0 | 14.6 |
| Eastside Mixed Conifer Forest | 18.4 | 16.2 | 16.2 | 15.3 | 16.4 | 16.5 |
| Lodgepole Pine Forest and Woodlands | 13.8 | | 13.0 | 12.6 | 13.2 | 12.8 |
| Ponderosa Pine Forest and Woodlands | 19.1 | 17.7 | 18.5 | 16.6 | 17.2 | 17.5 |

TABLE 2-continued

Estimated Mean Functional Redundancy Index for habitat types and Ecoprovinces (derived from NHI analysis).

| | | | | | | |
|---|---|---|---|---|---|---|
| Upland Aspen Forest | | | 11.9 | 11.7 | 12.1 | |
| Subalpine Parklands | 15.2 | 13.5 | 13.6 | 13.2 | 14.1 | 14.4 |
| Alpine Grasslands and Shrublands | 11.0 | 10.5 | 10.6 | 10.2 | 10.6 | 11.1 |
| Westside Grasslands | | | | | | |
| Ceanothus/Manzanita Shrublands | 11.7 | | | | | |
| Western Juniper and Mtn. Mahogany Woodlands | 14.3 | 13.7 | 14.5 | 13.8 | 13.0 | 13.5 |
| Eastside Canyon Shrublands | 12.0 | 12.4 | 12.4 | 12.4 | 12.3 | 12.3 |
| Eastside Grasslands | 16.1 | 16.4 | 16.9 | 16.6 | 16.1 | 16.6 |
| Shrub Steppe | 15.2 | 15.3 | 16.9 | 17.0 | 15.4 | 14.8 |
| Dwarf Shrub Steppe | 12.6 | | | 14.0 | | 12.1 |
| Desert Playa and Salt Scrub | 11.6 | | | 13.2 | | 12.0 |
| Agriculture Pasture and Mixed Environs | 5.7 | 5.6 | 6.0 | 6.0 | 6.0 | 6.2 |
| Urban and Mixed Environs | 3.3 | 3.1 | 2.7 | 3.1 | 2.7 | 3.5 |
| Open Water | 22.3 | 22.1 | 19.9 | 24.1 | 22.4 | 26.9 |
| Herbaceous Wetlands | 15.4 | 14.6 | 16.7 | 15.0 | 14.2 | 17.5 |
| Westside Riparian/Wetlands | | | | | | |
| Montane Coniferous Wetlands | 12.6 | 10.8 | 10.9 | 10.6 | 11.2 | 11.7 |
| Eastside Riparian/Wetlands | 22.0 | 20.7 | 20.7 | 20.0 | 20.4 | 21.9 |
| Coastal Dunes and Beaches | | | | | | |
| Coastal Headlands and Islets | | | | | | |
| Bays and Estuaries | | | | | | |

TABLE 3

MFRI adjustment factor for anthropogenic impacts.

| Extent of Substantial Anthropogenic Impacts within map unit (soil compaction, pollution, man-made structural changes, etc.) | Impact Intensity | | Source of Information |
|---|---|---|---|
| | Low | High | |
| None | 1.0 | 1.0 | Observed |
| Limited (<10% of area) | 0.95 | 0.85 | (field-verified) |
| Moderate (10-25% of area) | 0.90 | 0.80 | |
| Extensive (>25% of area) | 0.85 | 0.75 | |

TABLE 4

MFRI adjustment factor for adjacent land use.

A. Determine the percent of the map unit perimeter occupied by each anthropogenic habitat type/structural condition combination that is present
B. For each anthropogenic habitat type/structural condition combination, multiply the "percent perimeter" value by the appropriate factor from the following table:

| | |
|---|---|
| Urban (High Density) | 0.6 |
| Urban (Moderate Density) | 0.6 |
| Urban (Low Density) | 0.4 |
| Agriculture (Orchard or Unimproved Pasture) | 0.2 |
| Agriculture (Cultivated or Improved Pasture) | 0.2 |

C. Sum the results for all anthropogenic habitat type/structural condition combinations that are resent
D. Subtract the result from 1.0
E. If the result is greater than or equal to 0.9, use that value as the adjustment factor for adjacent land use;
If the result is less than 0.9, use 0.9 as the adjustment factor for adjacent land use To determine the potential habitat value for a site using the Intermediate Assessment Method, the area (in acres) and the proportion of the total site area are determined for each map unit. For each map unit, the MFRI for the appropriate Ecoprovince and habitat type are determined. Then, the adjustment factors for anthropogenic impacts (Table 3) and adjacent land use (Table 4 and Equation 24) are determined. The minimum value of the adjacent land use factor in Table 4 is 0.9. The adjacent land use factor is equal to 1.0 for anthropogenic map units.

$$F_L = 1 \times [\Sigma(P_i \times f_i)]$$ (Equation 24)

(applies only to map units comprised of natural habitat types)

Minimum Value of $F_L$ is 0.9, where $F_L$ is the adjacent land use adjustment factor for the given map unit, $P_i$ is the percent of the map unit perimeter occupied by a given anthropogenic habitat type/structural condition combination, and $f_i$ is the factor value for the given anthropogenic habitat type/structural condition combination (from Table 4).

The potential habitat value can be determined by multiplying the map unit area by the MFRI, then by the anthropogenic impact and adjacent land use adjustment factors:

$$V^*_M = I_F \times A_M \times F_A \times F_L$$ (Equation 25), where $V^*_M$ is the potential habitat value for the map unit, $I_F$ is the Mean Functional Redundancy Index for the given habitat type, $A_M$ is the area of the given map unit, $F_A$ is the anthropogenic impacts adjustment factor for the given map unit, and $F_L$ is the adjacent land use adjustment factor for the given map unit.

For each map unit, the percent cover of invasive plant species in each of three structural layers (grass/forbs, shrubs, trees) (Table 1) is used to derive an invasive species factor. An aggregate invasive species factor can then be determined by taking the geometric mean of the adjustment factors for each structural layer present within the map unit. The habitat value for each map unit is calculated by multiplying the potential habitat value by the aggregate invasive species factor:

$$V_M = V^*_M \times F_S \quad \text{(Equation 26),}$$

where $V_M$ is the Habitat Value for the map unit, $V^*_M$ is the potential habitat value for the map unit, and $F_S$ is the Invasive Species Factor for the given map unit.

The normalized habitat value for each map unit can be determined by dividing the habitat value by the map unit area (in acres). Finally, the habitat value for the entire site can be calculated by summing the values for the individual map units.

Baseline Assessment of Wetlands

Tracking of direct permanent impacts to jurisdictional wetlands can be accomplished using methods commonly applied to fill/removal activities regulated by the Army Corp of Engineers and/or the state agency that regulates such activities. Such methods rely on acreages, classifications of wetland type (the Cowardin system, the hydrogeomorphic approach (HGM), or both), and use of the HGM system to conduct functional assessments of abiotic process in the affected wetland area(s). Along with acreage, a wetlands tracking system can include the HGM score for the following abiotic functions: water storage/delay; sediment stabilization and phosphorous retention; nitrogen removal; thermoregulation; and primary productivity.

If an impact site is located in an area with a completed HGM model, the functional assessment can utilize the reference-based methodology. If not, the judgmental method can be used. The rating for each function should use the "highest functioning" standard.

Baseline Assessment of Species-Specific Value(s)

In another aspect of the system, values can be assigned to specific species within a site. Use of such a species-specific accounting module may arise in the context of the Endangered Species Act (ESA) or in the context of non-listed species that are of particular concern in a given area. The applicability of accounting tools for species-specific value can be determined on a bank-specific basis in coordination with the appropriate regulatory agency or group (in the state of Oregon, this is the Mitigation & Conservation Banking Review Team (MCBRT)). If the species-specific module is utilized at a bank, it is preferably also used at projects that utilize species-specific credits from that bank. Species-specific values can be tracked as a regulatory "backstop" that complements the habitat value accounting system and provides assurances that impacts to individual species are adequately offset.

Species-Specific Value

In an exemplary embodiment, a species-specific value can be quantified on the basis of "habitat units", each of which represents a spatially contiguous area of relatively homogeneous habitat that is suitable for the species of interest. In an exemplary approach, the species-specific value of each habitat unit incorporates four factors (Equation 27): (1) the extent of habitat, expressed in terms of acres of habitat; (2) the suitability of the habitat, rated from 0 to 10, determined using a Habitat Suitability Relationship (HSR) (such as the HSR scale developed for each species included in the Oregon Department of Transportation (ODOT) banking program); (3) a Habitat Utility Rating (HUR) for the impact site, rated from 0 to 1, determined using species-specific criteria (such as the HUR scale developed for each species included in the ODOT banking program); and (4) a Habitat Integrity Rating (HIR) of the habitat unit, rated from 0 to 1, determined using species-specific criteria (such as that the HIR scale developed for each species included in the ODOT banking program).

$$S_M = A_M \times F_S \times F_U \times F_O \quad \text{(Equation 27),}$$

where $S_M$ is the species-specific value of a given habitat unit for a given species/lifestage, $A_M$ is the area of a given habitat unit, $F_S$ is the HSR of the given habitat unit for a given species, $F_U$ is the Habitat Utility Rating of the site for a given species, and $F_O$ is the Habitat Integrity Rating of the given habitat unit for a given species.

HSRs can be developed for each species (and possibly for specific lifestages, in some instances) based on available literature and coordination with the appropriate government agencies. Each HSR desirably incorporates the presence, abundance, and/or quality of individual habitat types, structural conditions, and KECs to rate habitat suitability on a scale of zero to ten. The HSR for a given species can be applied throughout an entire state or states.

The specific species' ability to use habitat at the site is accounted for with the Habitat Utility Rating. For migratory species, the Habitat Utility Rating considers the presence and character of connectivity barriers. For resident species, the Habitat Utility Rating considers factors such as the abundance of the population and proximity to other populations. Desirably, sites that are completely accessible to a specific species or lifestage are assigned a Habitat Utility Rating of one, while completely inaccessible areas are assigned a value of zero. For sites that contain connectivity barriers, it may be necessary to determine the Habitat Utility Rating separately for the different areas of the site.

The Habitat Integrity Rating is used to account for the role of off-site influences that adversely affect the suitability or long-term viability of habitat for the specific species.

Development of HSRs, HURs, and HIRs for the Oregon chub is described in Appendix E. Similar values can be obtained for other species using the methodology described in Appendix E.

Debit Valuation for Impacts

Habitat Value Debit Calculation

In another aspect of the system, debits values can be assigned to impacts to a particular site. In particular embodiments, debit values are assigned for direct permanent, indirect permanent, and direct temporary impacts. Typically, no debit values are assigned for indirect temporary impacts, because such impacts can be avoided or minimized via implementation of environmental performance standards or conservation measures.

Direct Permanent Impacts

Permanent impacts typically are those with duration greater than twelve months. Typically, three types of direct permanent adverse impacts are considered in the assessment of a site: (1) those that result in conversion of one habitat type to another (such as converting Montane Mixed Conifer Forest to Urban and Mixed Environs); (2) those that result in permanent modifications to structural conditions or KECs due to newly initiated maintenance activities (such as mowing of rights-of-way in areas that would otherwise contain grasses of varying heights); and (3) changes in habitat connectivity.

Habitat Conversion

The debit value for habitat conversion is the difference between the baseline and future habitat value. In one specific approach, this value is calculated by reducing the acreage of the habitat type(s) being converted (typically a natural habitat type or Agriculture, Pasture, and Mixed Environs) and increasing the acreage of the habitat type being created (typically Urban and Mixed Environs). The calculations for determining debit value differ depending on whether the full or intermediate assessment method is used to determine the baseline habitat value, as described below.

Debiting for Habitat Conversion with the Full Assessment Method

If the baseline habitat value is determined using the full assessment method, the post-project acreage DWAASV, and DWAACV for the diminished and enlarged habitat types and the post-project invasive species factor for each map unit can be calculated.

The post-project DWAASV for each habitat type can be determined by multiplying the pre-impact DWAASV for each habitat type by the ratio of post-project to pre-project habitat type acreage (this ratio is less than one for diminished habitat types and greater than one for enlarged habitat types). This simple calculation is sufficient to adjust the DWAASV, since it is only the extent of the habitat type that is changing (rather than the character of the habitat type), and habitat type area is directly related to DWAASV. The post-project invasive species factor should, in most cases, be equal to the pre-project invasive species factor.

The post-project species value of each map unit is calculated with the post-project DWAASV, the post-project acreage for each habitat type, and the post-project acreage and invasive species factor for each map unit (Equations 28a and 28b). The post-project value of the entire impact site can be determined as the sum of the post-project map unit values (Equation 28c).

$$DWAASV' = DWAASV \times (A'_H / A_H) \quad \text{(Equation 28a)}$$

and $$V'_M = (DWAASV' \times A_M \times F'_S) / (A'_H / A_S) \quad \text{(Equation 28b)}$$

and $$V'_S = \Sigma(V'_M) \quad \text{(Equation 28c)}$$

where DWAASV' is the post-project DWAASV for the habitat type associated with the map unit following habitat type conversion, DWAASV is the discrete weighted area average value for the baseline habitat type associated with the map unit, $V'_M$ is the post-project habitat value for the given map unit, $A_M$ is the area of the given map unit, $F'_S$ is the post-project Invasive Species Factor, $A'_H$ is the post-project extent of the given habitat type, $A_H$ is the baseline extent of the given habitat type, $A_S$ is the area of the entire site, and $V'_S$ is the post-project habitat value for the entire site.

Similarly, the post-project DWAACV for each habitat type can be determined by multiplying the pre-impact DWAACV for each habitat type by the ratio of post-project to pre-project habitat type acreage. The post-project correlate value of each map unit can be calculated by multiplying the post-project DWAACV by the area of the map unit and the post-project invasive species factor and dividing this product by the ratio $A'_H/A_S$. The post-project correlate value of the entire impact site can be determined as the sum of the post-project map unit values. A post-project value for the entire site can be established by averaging or summing the post-project species value the post-project correlate values.

Debiting for Habitat Conversion with the Intermediate Assessment Method

If the baseline habitat value is determined using the intermediate assessment method, the extent of habitat conversion can determined by analyzing how the project footprint overlaps with individual map units. For example, if affected map units are only partially within the footprint area, they are divided into two or more parts according to post-project habitat types (i.e., some of the original map unit would remain the original habitat type and some would be converted to a different habitat type). The pre-project habitat value of the affected map units is allocated to the new map units in a proportional manner, based on the area of the new map units (Equation 29a and 29b). The post-project value of individual map units is calculated by multiplying the post-project MFRI by the area of the map unit, the anthropogenic impacts and adjacent land use adjustment factors, and the invasive species factor (Equation 30).

$$V_m = V_M \times (A_m / A_M) \quad \text{(Equation 29a)}$$

or $$V_m = V_N \times A_m \quad \text{(Equation 29b)}$$

where $V_m$ is the habitat value allocated to a given portion of a given map unit, $A_m$ is the area of a given portion of a given map unit, $V_M$ is the habitat value for the given map unit, $A_M$ is the area of the given map unit, and $V_N$ is the normalized habitat value for the given map unit.

$$V'_M = I'_F \times A_M \times F'_A \times F'_L \times F'_S \quad \text{(Equation 15)}$$

where $V'_M$ is the post-impact Habitat Value for the given map unit, $V_M$ is the Habitat Value for the given map unit, $I'_F$ is the mean functional redundancy index associated with the habitat type that is being created within the given map unit, $A_M$ is the area of the given map unit, $F'_A$ is the post-impact anthropogenic impacts adjustment factor for the given map unit, $F'_L$ is the post-impact adjacent land use adjustment factor for the given map unit, and $F'_S$ is the post-impact Invasive Species Factor for the given map unit

Permanent Modifications in Structural Condition or KECs

Initiation of maintenance activities can cause modifications to structural conditions or KECs without converting one habitat type to another (e.g., mowing vegetation within rights-of-way). In these instances, the degree to which KECs are affected can be considered. As with assigning debit values for habitat conversion, different calculation methods are used depending on whether the full or intermediate assessment method is used to determine baseline habitat value.

Debiting for Habitat Modification with the Full Assessment Method

When the full assessment method is used to determine the baseline habitat value, calculation of the debit value can include determining the number of existing KECs that are adversely affected by the new activity and whether the areal cover of invasive species is anticipated to change as a result of the new activity (if so, the invasive species factor can be adjusted).

In an exemplary approach, the ratio of KECs not affected to existing KECs is multiplied by the baseline value of the affected map unit to determine the post-modification habitat value of the map unit (Equation 31). The debit value for each affected map unit is calculated as the difference between the pre- and post-modification habitat values. If only a portion of a map unit is affected, the baseline habitat value for that portion can be determined using Equations 31a and 31b.

$$V'_M = V_M \times [(k - k_a)/k] \times (F'_S/F_S) \quad \text{(Equation 31)},$$

where $V'_M$ is the post-impact habitat value for the given map unit, $V_M$ is the baseline habitat value for the given map unit, k is the number of KECs present in the map unit, $k_a$ is the number of KECs anticipated to be adversely affected, $F'_S$ is the post-project Invasive Species Factor, and $F_S$ is the baseline Invasive Species Factor.

Debiting for Habitat Modification with the Intermediate Assessment Method

When the intermediate assessment method is used to determine the baseline habitat value, the post-modification habitat value can be calculated using Equation 30. If only a portion of a map unit is affected, the baseline value for that portion is determined using Equation 29a or 29b. If desired, the post-modification habitat value can be assessed using professional judgment to determine the post-modification anthropogenic impact adjustment factor and to assess potential changes in the cover of invasive species.

Indirect Permanent (CHIPS)

Calculation of debit values for indirect permanent impacts accounts for actions that reduce habitat value in areas adjacent to project sites. This calculation utilizes the Comprehensive Habitat Improvement Point System (CHIPS) methodology. The debit value for indirect permanent impacts is based on three factors: the baseline habitat value of the affected areas, the type and intensity of impacts, and Ecoprovince priorities. Appendix F describes the Ecoprovince priorities for the Deschutes Ecoprovince in the state of Oregon. Ecoprovince priorities for other geographic areas can be determined using the methodology described in Appendix F.

The acreage of impacted areas is determined in order to calculate their habitat value. For changes to existing roadways, the extent of the affected area is determined by multiplying the width (in feet) of shifts in horizontal alignment and/or of increases in roadway width by the length (parallel to the roadway) of the project. This represents the area that is affected by the roadway modification.

In an exemplary embodiment, the baseline habitat value of the affected area is derived from the baseline value of the affected map units, and is determined using the following method:

1. identifying the natural or agricultural map units adjacent to the roadway (and its associated Urban and Mixed Environs map units) and on the same side of the roadway as the impact and determining the baseline habitat value and the normalized habitat value of these map units;
2. determining the extent dimensions of the area affected by the indirect permanent impacts, as described in the previous paragraph, using GIS or other suitable techniques to "split" map units as necessary; and
3. determining the habitat value of the affected area within each map unit by multiplying the normalized habitat value by the acreage of the affected area.

The type and intensity of indirect permanent impacts can be quantified using a set of factors to describe the types of impacts, the resources being affected, and the relative intensity of impacts (as shown in Table 5). When assigning values to these factors, impact minimization efforts described in performance standards or conservation measures should be considered. The overall Indirect Impact Factor can be calculated by summing the factors for impact type and species presence, then multiplying by the highway type factor. The highway type factor is intended to account for higher or lower impact intensities associated with higher or lower levels of traffic. The Indirect Impact Factor may vary between map units, since the type of impact and the presence of focal species can vary between map units of different habitat types.

TABLE 5

Indirect impact factor.

| Type and Intensity of Impact | Factor |
|---|---|
| Type of Impact(s) | |
| 1a. Pollution (noise, emissions, runoff and sediment, etc.) | 0.05 |
| 1b. Edge Effects (weeds, microclimate, large woody debris removal, etc.) | 0.05 |
| (A) Sum of 1a and 1b | |
| Focal Species Presence | |
| 2a. No Focal Species Present | 0 |
| 2b. Focal Species Present, but no TES Species Present | 0.05 |
| 2c. TES Species Present | 0.10 |
| (B) Appropriate value for affected species assemblage (2a, 2b, or 2c) | |
| (C) Sum of Factor Values for A and B | |
| (D) Highway Type | |
| Rural (non-interstate) | 0.8 |
| Rural (interstate) | 1.0 |
| Urban (interstate and non-interstate) | 1.2 |
| Indirect Impact Factor = C × D | |

Ecoprovince Priorities are the third component of the debit valuation for indirect permanent impacts. A weighting factor based on habitat type is assigned to each affected map unit (Table 6). Urban and agricultural habitat types are assigned a weighting factor of zero. Weighting factors for ecoprovince priority habitat types are 1.2 (representing a 20% "premium" for impacts to these habitat types), while weighting factors for other natural habitat types are 1.0.

For each map unit, the debit value for indirect permanent impacts can be calculated by multiplying the habitat value of the affected area by the Indirect Impact Factor, then multiplying by the ecoprovince weighting factor (no debit value is assigned for indirect impacts to urban and agricultural habitat types, since the weighting factor for these habitats is zero) (Equation 32). The total debit value for indirect permanent impacts is then determined by summing the debit values from individual map units.

$$V_{PI} = \Sigma(V_M \times F_I \times F_E) \quad \text{(Equation 32)},$$

where $V_{PI}$ is the debit value for indirect permanent impacts, $V_M$ is the baseline habitat value for the given map unit, $F_I$ is the Indirect Impact Factor, and $F_E$ is the ecoprovince priority weighting factor.

TABLE 6

Weighting factors for habitat types and Ecoprovinces. Habitat types not included in this table have a weighting factor of 1 for all Ecoprovinces.

| Habitat type | Ecoprovince | | | | | | | | | | | |
|---|---|---|---|---|---|---|---|---|---|---|---|---|
| | S. OR Coast | N. OR Coast | Lower Columbia | Mid Columbia | Willamette | Klamath | Deschutes | John Day | OR Closed Basins | Mid. Snake/ Boise | Mid Snake/ Powder | Lower Snake |
| Westside Lowlands Conifer-Hardwood Forest | 1.2 | 1 | 1 | 1 | 1 | 1.2 | 1.2 | 1 | 1 | 1 | 1 | 1 |
| Westside Oak & Douglas-fir Forest & Woodlands | 1.2 | 1.2 | 1 | 1 | 1.2 | 1.2 | 1 | 1 | 1 | 1 | 1 | 1 |
| Lodgepole Pine Forest and Woodlands | 1.2 | 1 | 1 | 1 | 1 | 1 | 1.2 | 1 | 1.2 | 1.2 | 1.2 | 1.2 |
| Ponderosa Pine Forest and Woodlands | 1.2 | 1 | 1 | 1 | 1 | 1 | 1.2 | 1.2 | 1 | 1.2 | 1.2 | 1.2 |
| Upland Aspen Forest | 1 | 1 | 1 | 1 | 1 | 1 | 1.2 | 1 | 1 | 1 | 1 | 1.2 |
| Subalpine Parklands | 1 | 1 | 1 | 1 | 1 | 1 | 1 | 1 | 1.2 | 1 | 1.2 | 1.2 |
| Westside Grasslands | 1.2 | 1 | 1 | 1 | 1.2 | 1 | 1 | 1 | 1 | 1 | 1 | 1 |
| Ceanothus/Manzanita Shrublands | 1 | 1 | 1 | 1 | 1 | 1.2 | 1.2 | 1.2 | 1 | 1 | 1 | 1 |
| Eastside Grasslands | 1 | 1 | 1 | 1.2 | 1 | 1.2 | 1 | 1.2 | 1.2 | 1 | 1.2 | 1 |
| Shrub Steppe | 1 | 1 | 1 | 1 | 1 | 1 | 1 | 1 | 1 | 1 | 1 | 1.2 |
| Dwarf Shrub Steppe | 1 | 1 | 1 | 1 | 1 | 1 | 1 | 1 | 1 | 1.2 | 1.2 | 1 |
| Desert Playa and Salt Scrub | 1 | 1 | 1 | 1 | 1 | 1.2 | 1 | 1.2 | 1.2 | 1.2 | 1.2 | 1 |
| Agriculture Pasture and Mixed Environs | 0 | 0 | 0 | 0 | 0 | 0 | 0 | 0 | 0 | 0 | 0 | 0 |
| Urban and Mixed Environs | 0 | 0 | 0 | 0 | 0 | 0 | 0 | 0 | 0 | 0 | 0 | 0 |
| Herbaceous Wetlands | 1 | 1.2 | 1.2 | 1.2 | 1.2 | 1 | 1 | 1 | 1 | 1 | 1 | 1 |
| Westside Riparian/Wetlands | 1.2 | 1.2 | 1.2 | 1.2 | 1.2 | 1 | 1 | 1 | 1 | 1 | 1 | 1 |
| Montane Coniferous Wetlands | 1 | 1 | 1 | 1 | 1 | 1 | 1 | 1.2 | 1 | 1 | 1 | 1 |
| Eastside Riparian/Wetlands | 1.2 | 1 | 1 | 1.2 | 1 | 1.2 | 1.2 | 1.2 | 1.2 | 1.2 | 1.2 | 1.2 |
| Coastal Dunes and Beaches | 1 | 1.2 | 1.2 | 1 | 1 | 1 | 1 | 1 | 1 | 1 | 1 | 1 |
| Bays and Estuaries | 1 | 1.2 | 1.2 | 1 | 1 | 1 | 1 | 1 | 1 | 1 | 1 | 1 |

[1] Large diameter trees (DBH > 29") are a priority in all Ecoprovinces.

Direct Temporary (CHIPS)

Direct temporary impacts can result from construction of staging areas and detours that are in place for no more than 12 months. Calculation of debit values for direct temporary impacts accounts for actions that involve conversion of natural habitat types to the Urban and Mixed Environs habitat type, followed by site restoration. In an exemplary embodiment, the debit value for direct temporary impacts is determined using the CHIPS methodology to integrate four factors: the baseline habitat value of the affected areas, the duration of impacts, the degree of habitat function recovery within five years of project completion, and Ecoprovince Priorities.

The baseline habitat value of the affected area can be derived from the baseline value of the affected map units using the following method:
1. determining the baseline habitat value and the normalized habitat value of the map units containing the affected areas;
2. determining the extent of the area subject to direct temporary impacts within each map unit, using, for example, GIS to "split" map units as necessary; and
3. determining the baseline value of the affected area within each map unit by multiplying the normalized habitat value by acreage of the affected area.

The duration of such impacts can be estimated using construction plans. In particular embodiments, impacts with duration greater than twelve months are considered permanent. Debit values for permanent impacts are discussed above.

The degree of habitat function recovery is anticipated for the affected portion of each map unit based on the timing of restoration actions and the length of time required to meet process-based design criteria.

Values for anticipated duration of impacts and estimated recovery of habitat function can be integrated into a single factor for use in debit valuation (Equation 33). Using Equation 33, the Duration/Recovery Factor can be calculated for each map unit. Map units for which zero percent habitat function recovery is anticipated are assigned a Duration/Recovery Factor value of 1.0 and are thus debited for the entire value of the affected habitat.

$$F_D = (f_d/12) + \{[1 \times (f_d/12)] \times (1 \times f_r)\} \qquad \text{(Equation 33)},$$

where $F_D$ is the Duration/Recovery Factor, $f_d$ is the anticipated duration of impacts, in months, and $f_r$ is the anticipated percent ecological recovery within 5 years of project completion, expressed as a decimal.

Ecoprovince Priorities are the fourth component of the debit valuation for direct temporary impacts, and can be assigned in the same manner as for indirect permanent impacts (see Table 6).

For each map unit, the debit value for direct temporary impacts can be calculated by multiplying the habitat value of the affected area by the Duration/Recovery Factor, then multiplying by the ecoprovince weighting factor (no debit value is assigned for direct temporary impacts to urban and agricultural habitat types, since the weighting factor for these habitats is zero) (Equation 34). The total debit value for direct temporary impacts can then be determined by summing the debit values from individual map units.

$$V_{TD} = \Sigma(V_M \times F_D \times F_E)$$ (Equation 34), where $V_{TD}$ is the debit value for direct temporary impacts, $V_M$ is the baseline habitat value for the given map unit, $F_D$ is the duration/recovery factor, and $F_E$ is the ecoprovince priority weighting factor.

Determining Wetland Debits

The acreage and type of wetlands that will be affected by direct permanent impacts can be determined using wetland delineations and design drawings. The debit value can be expressed in terms of acres of wetlands permanently affected by fill/removal. Permanent impacts are those impacts with duration greater than twelve months.

Determining Species-Specific Debits

In another aspect of the system, in projects that permanently impact the habitat of more than one specific species, debit values can be assigned for each of the affected species. Debits can be calculated for direct permanent, direct temporary, and indirect permanent impacts.

Direct Permanent Impacts

The species-specific debit for direct permanent adverse impacts to a given species can be calculated as the difference between the pre- and post-project species-specific value (Equation 35a or 35b).

$$\Delta S_V = S'_M - S_M$$ (Equation 35a)

or $$\Delta S_V = (A_M \times F'_S \times F'_U \times F'_O) - (A_M \times F_S \times F_U \times F_O)$$ (Equation 35b)

where $\Delta S_V$ is the debit or credit for species-specific value due to the changes in habitat quality, extent, or connectivity, $S'_M$ is the post-project species-specific value of the given habitat unit for a given species, $S_M$ is the baseline species-specific value of the given habitat unit for a given species, $A_M$ is the area of the given habitat unit, $F'_S$ is the post-project HSR (rated from 0 to 10) of the given habitat unit for a given species, $F_S$ is the baseline HSR (rated from 0 to 10) of the given habitat unit for a given species/lifestage, $F'_U$ is the post-project Habitat Utility Rating of the site for a given species, $F_U$ is the baseline Habitat Utility Rating of the site for a given species, $F'_O$ is the post-project Habitat Integrity Rating of the given habitat unit for a given species, and $F_O$ is the baseline Habitat Integrity Rating of the given habitat unit for a given species.

Projects that completely impair access to habitat for specific species are assigned debits determined according to the extent and quality of the affected habitat (i.e., the post-project Habitat Utility Rating and species-specific value both equal zero, since the species cannot access the habitat). Debits for projects that partially impair access to habitat reflect the extent and quality of affected habitat as well as the degree to which access is impaired (expressed as the difference between pre- and post-project Habitat Utility Ratings).

Indirect Permanent Impacts

The Habitat Integrity Rating can be used to account for indirect impacts to habitat for ESA-listed species. This rating is incorporated in the species-specific value calculation; thus, the debit value for indirect permanent impacts is incorporated within the overall debit value (future value minus baseline value). The specific portion of the debit value that can be attributed to indirect permanent impacts can be determined by holding all other values (area, HSR, and Habitat Utility Rating) constant and quantifying differences in the baseline and future species-specific values that result from modification of the Habitat Integrity Rating.

Direct Temporary Impacts

The method used to determine debit values for direct temporary impacts (described below) provides incentives for minimizing the extent and duration of impacts, as well as the time required for impacted habitats to recover. Similar to the approach used in the habitat value accounting system, the species-specific debit value for direct temporary impacts can be determined by multiplying the baseline species-specific value by a Duration/Recovery Factor that integrates the anticipated duration of the project and the anticipated rate of recovery (Equation 36). For impacts to habitat for ESA-listed species, the maximum duration of impacts that can be considered temporary is 60 months.

$$F_{DSS} = (f_d/60) + \{[1-(f_d/60)] \times (1-f_r)\}$$ (Equation 36)

where $F_{DSS}$ is the species-specific Duration/Recovery Factor, $f_d$ is the anticipated duration of impacts, in months, and $f_r$ is the anticipated percent ecological recovery within 5 years of project completion, expressed as a decimal.

Evaluating Credit Generation at Mitigation/Conservation Banks

Habitat Value Credit Calculation

Three categories of mitigation/conservation activities (preservation, conversion, and augmentation) can be used as the basis for habitat value credit calculations. There are five types of activities commonly implemented in mitigation/conservation banks, namely, protection, creation, restoration, enhancement, and prescriptive management, and are based on whether or not changes in habitat type(s) and/or KECs are anticipated. Although multiple activities can occur within a bank, different accounting methods can be applied to the activities.

Conceptually, changes in habitat value caused by mitigation/conservation activities can be quantified as future value less baseline value. This conceptual view assumes that habitat is at equilibrium, such that the current baseline value can be considered equivalent to the future value were it not for management interventions.

In those instances when the equilibrium assumption is not valid (for instance, as when the cover of invasive species within a map unit has increased and is expected to continue to increase, or when ecological succession is occurring and habitat elements are developing at a relatively high rate) changes in overall habitat value due to certain activities is considered in terms of future conditions with and without management intervention. The changes in habitat value expected to occur in the absence of intervention can be quantified using the full assessment method (with respect to increased/decreased cover of invasives) and the "augmentation accounting method" (with respect to the gain/loss of KECs).

Preservation Accounting Method

Credit value generated from preservation of habitat can be determined in consultation with the bank-specific MCBRT. The methods described below are intended to provide a framework that can be used to initiate the process of determining preservation credit values. These methods consider, for example, baseline habitat value, a landscape context factor, a vulnerability multiplier, and a conservation multiplier. Ratings associated with these factors are designed to accommodate sites possessing a broad range of ecological and jurisdictional characteristics (as reflected in calculated preservation multipliers that span two orders of magnitude).

Landscape Context Factor

The landscape context factor accounts for rarity and biological importance and can be determined for each habitat type found within the proposed mitigation/conservation bank. The factor incorporates four equally weighted elements: rarity, trend, focal species presence, and landscape permeability. While rarity and trend are determined for individual habitat types, the potential presence of desired focal species and landscape permeability are determined at the scale of the entire bank site (and applied uniformly to the habitat types within the bank site). If the service area for a bank encompasses multiple ecoprovinces, the values of the factors for rarity, trend, and focal species are determined by taking the geometric mean of the incremental values for each ecoprovince.

Rarity of each habitat type is based on the proportion of the relevant ecoprovince occupied by the given habitat type (e.g., see Table 7). Habitat types that are more rare are assigned higher incremental values for the rarity element (Table 8). Incremental values for this element are diminished for habitat types that occupy more than 20 percent of the ecoprovince in which the bank is located.

TABLE 7

Rarity of habitat types in the Pacific Northwest, by ecoprovince, expressed as approximate ratio (percent) of current habitat type acreage to total ecoprovince acreage.

| Habitat type | Ecoprovince | | | | | | | | | | | |
|---|---|---|---|---|---|---|---|---|---|---|---|---|
| | S. OR Coast | N. OR Coast | Lower Columbia | Mid Columbia | Willamette | Klamath | Deschutes | John Day | OR Closed Basins | Mid. Snake/Boise | Mid Snake/Powder | Lower Snake |
| Westside Lowlands Conifer-Hardwood Forest | 29.9 | 93.3 | 78.7 | 4.1 | 49.0 | <0.1 | <0.1 | | | | | |
| Westside Oak & Douglas-fir Forest & Woodlands | 1.7 | <0.1 | 0.2 | 0.2 | 3.9 | 0.1 | | | | | | |
| Southwest Oregon Mixed Conifer-Hardwood Forest | 48.2 | 0.1 | | | 0.1 | 2.3 | <0.1 | | | | | |
| Montane Mixed Conifer Forest | 6.8 | <0.1 | 6.7 | 2.1 | 13.7 | 6.9 | 8.0 | 2.6 | <0.1 | 0.7 | 3.3 | 6.9 |
| Eastside Mixed Conifer Forest | <0.1 | | | 7.6 | <0.1 | 7.9 | 9.8 | 16.5 | 2.8 | 3.5 | 22.4 | 30.9 |
| Lodgepole Pine Forest and Woodlands | <0.1 | <0.1 | <0.1 | <0.1 | <0.1 | 6.0 | 3.1 | <0.1 | 0.9 | <0.1 | 0.1 | <0.1 |
| Ponderosa Pine Forest and Woodlands | 1.1 | | | 7.2 | <0.1 | 36.2 | 19.2 | 25.1 | 9.3 | 1.5 | 7.7 | 17.4 |
| Upland Aspen Forest | | | | <0.1 | | | <0.1 | | 0.2 | | <0.1 | <0.1 |
| Subalpine Parklands | <0.1 | | 0.4 | 0.1 | | 0.3 | 0.2 | 0.6 | | 0.1 | <0.1 | <0.1 |
| Alpine Grasslands and Shrublands | 0.2 | | 0.3 | 0.1 | 0.1 | 0.7 | 0.2 | 0.4 | 0.1 | 0.1 | 3.2 | 3.6 |
| Westside Grasslands | 0.5 | | | | | <0.1 | | | | | | |
| Ceanothus/Manzanita Shrublands | | | | <0.1 | <0.1 | 0.3 | <0.1 | <0.1 | <0.1 | <0.1 | <0.1 | <0.1 |
| Western Juniper and Mtn. Mahogany Woodlands | | | | 1.0 | | 9.5 | 19.7 | 25.4 | 7.0 | 2.3 | 1.1 | <0.1 |
| Eastside Canyon Shrublands | | | | <0.1 | | | 1.2 | 3.2 | | 1.6 | | |
| Eastside Grasslands | 0.2 | | | 17.4 | | <0.1 | 0.1 | 2.1 | 0.5 | 0.9 | 6.1 | 29.1 |
| Shrub Steppe | <0.1 | | | 20.6 | | 7.6 | 28.9 | 15.9 | 59.8 | 83.6 | 45.5 | 1.6 |
| Dwarf Shrub Steppe | | | | | | 1.6 | 1.9 | | 2.5 | 0.3 | <0.1 | |
| Desert Playa and Salt Scrub | | | | <0.1 | | <0.1 | <0.1 | <0.1 | 6.6 | 0.2 | <0.1 | |
| Agriculture Pasture and Mixed Environs | 8.7 | 2.0 | 6.0 | 37.4 | 25.0 | 9.4 | 4.9 | 7.7 | 3.0 | 3.7 | 6.7 | 9.6 |
| Urban and Mixed Environs | 0.8 | 1.0 | 1.7 | 0.8 | 5.1 | 0.4 | 0.3 | 0.2 | <0.1 | 0.1 | 0.3 | 0.3 |
| Open Water | 0.5 | 0.3 | 0.5 | 1.3 | 1.1 | 3.1 | 0.8 | 0.1 | 3.0 | 0.6 | 1.0 | 0.2 |
| Herbaceous Wetlands | 0.5 | 0.5 | 1.9 | 0.1 | 0.2 | 7.1 | 0.7 | 0.7 | 4.0 | 0.9 | 2.5 | 0.4 |
| Westside Riparian/Wetlands | 0.2 | 0.3 | 1.7 | <0.1 | 1.6 | <0.1 | | | | | | |
| Montane Coniferous Wetlands | <0.1 | | 0.1 | <0.1 | <0.1 | 0.7 | 0.2 | <0.1 | <0.1 | | <0.1 | 0.1 |
| Eastside Riparian/Wetlands | <0.1 | | | 0.1 | | <0.1 | 0.1 | <0.1 | 0.1 | 0.1 | <0.1 | <0.1 |
| Coastal Dunes and Beaches | 0.3 | 0.9 | <0.1 | | | | | | | | | |
| Coastal Headlands and Islets | 0.1 | 0.1 | <0.1 | | | | | | | | | |
| Bays and Estuaries | 0.3 | 1.4 | 1.7 | | 0.1 | | | | | | | |

TABLE 8

Habitat rarity element of the landscape context factor.

| Percent of ecoprovince occupied by habitat type | Incremental Value ($f_R$) |
|---|---|
| 0-1% | 0.01 |
| 1-5% | 0.0075 |
| 5-10% | 0.005 |
| 10-20% | 0.0 |
| >20% | -0.01 |

The proportional change in extent between historical times and current (year 2000) conditions has been determined for each habitat type in each ecoprovince (Table 9). These values, in concert with professional judgment of the MCBRT, can be used as the basis for determining the overall trend of habitat extent. Habitat types that have experienced greater proportional losses in extent are assigned higher incremental values for the trend element (Table 10). Values for this element are diminished for habitat types that have expanded since the historic period. When considering the trend of open water habitat types, it is important to note that reservoir construction has caused a net increase in the extent of open water habitat in several Ecoprovinces, even as the extent of certain important types of open water habitat (off-channel sloughs, oxbow lakes, etc.) has decreased substantially. For this reason, the minimum incremental value of the trend factor for open water habitat types is 0.0. The appropriate agency or mitigation review team can be consulted to determine the trends for habitat types whose historic and/or current acreages were likely to be under-represented due to mapping nuisances (denoted as "NM" in Table 9).

TABLE 9

Trend in extent of habitat types in the Pacific Northwest, by ecoprovince, expressed as approximate percent difference in habitat type area between historic and current conditions ("NM" indicates inadequate historic mapping of habitat type; "NP" indicates habitat type not present historically).

| Habitat type | S. OR Coast | N. OR Coast | Lower Columbia | Mid Columbia | Willamette | Klamath | Deschutes | John Day | OR Closed Basins | Mid. Snake/ Boise | Mid Snake/ Powder | Lower Snake |
|---|---|---|---|---|---|---|---|---|---|---|---|---|
| Westside Lowlands Conifer-Hardwood Forest | -56 | 13 | 6 | >50 | 4 | -100 | -93 | | | | | |
| Westside Oak & Douglas-fir Forest & Woodlands | -76 | -99 | -96 | NM | -85 | -85 | | | | | | |
| Southwest Oregon Mixed Conifer-Hardwood Forest | >50 | NM | | | NM | 307 | NM | | | | | |
| Montane Mixed Conifer Forest | >50 | -100 | -19 | >50 | >50 | >50 | >50 | >50 | 39 | >50 | >50 | >50 |
| Eastside Mixed Conifer Forest | -81 | | | -12 | -92 | >50 | >50 | >50 | >50 | >50 | >50 | >50 |
| Lodgepole Pine Forest and Woodlands | -98 | -100 | -100 | -97 | -100 | -18 | -60 | -100 | -46 | -97 | -99 | -100 |
| Ponderosa Pine Forest & Woodlands | -86 | | | 19 | -100 | -29 | -29 | -31 | -17 | -68 | -71 | -45 |
| Upland Aspen Forest | | | | -100 | | | -100 | | 64 | | NM | -100 |
| Subalpine Parklands | NM | | NM | NM | >50 | -73 | >50 | | -69 | | -100 | -100 |
| Alpine Grasslands and Shrublands | >50 | | -71 | >50 | -90 | >50 | 14 | >50 | 44 | >50 | >50 | >50 |
| Westside Grasslands | -82 | | | | -100 | | | | | | | |
| Ceanothus/Manzanita Shrublands | | | | -100 | 0 | -86 | -100 | -100 | -100 | -100 | -100 | -100 |
| Western Juniper & Mtn. Mahogany Woodlands | | | | NM | | NM | NM | NM | NM | NM | NM | NM |
| Eastside Canyon Shrublands | | | | NM | | | NM | NM | | NM | | |
| Eastside Grasslands | NM | | -74 | | | -100 | -99 | -93 | -82 | -4 | -52 | -21 |
| Shrub Steppe | -100 | | | >50 | | 45 | -14 | -32 | -5 | 17 | -8 | -80 |
| Dwarf Shrub Steppe | | | | | | | 17 | >50 | -20 | -96 | -100 | |
| Desert Playa and Salt Scrub | | | | -100 | | -100 | 162 | -100 | -47 | -98 | -100 | |
| Agriculture Pasture and Mixed Environs | NP | NP | NP | NP | NP | NP | NP | NP | NP | NP | NP | NP |
| Urban and Mixed Environs | NP | NP | NP | NP | NP | NP | NP | NP | NP | NP | NP | NP |
| Open Water | -36 | -89 | -89 | -44 | >50 | -25 | -25 | >50 | 36 | >50 | >50 | -31 |
| Herbaceous Wetlands | -5 | -83 | -68 | -89 | NM | >50 | >50 | >50 | >50 | NM | NM | NM |
| Westside Riparian/Wetlands | -76 | -96 | 50 | -100 | -68 | NM | | | | | | |
| Montane Coniferous Wetlands | NM | | NM | NM | NM | NM | NM | NM | NM | | NM | NM |
| Eastside Riparian/Wetlands | -100 | | | -65 | | -100 | -65 | NM | -90 | -98 | -100 | -100 |
| Coastal Dunes and Beaches | >50 | 12 | -95 | | | | | | | | | |
| Coastal Headlands and Islets | >50 | -75 | -80 | | | | | | | | | |
| Bays and Estuaries | NM | NM | NM | | NM | | | | | | | |

TABLE 10

Habitat trend element of the landscape context factor.

| Percent change in habitat type area between historic and current conditions | Incremental Value ($f_T$) |
|---|---|
| Greater than a 75% loss in habitat type area | 0.01 |
| 50-75% loss in habitat type area | 0.0075 |
| 25-50% loss in habitat type area | 0.005 |
| 0-25% loss in habitat type area | 0.0 |
| 0-50% gain in habitat type area | −0.01 |
| >50% gain in habitat type area | −0.02 |

The number of desired focal species for which the bank provides habitat is determined based on the species list generated for the bank site and the Ecoprovince Priorities (see, e.g., Appendix F). Desired focal species are those listed under the federal or state ESA, species identified by Partners in Flight, Functional Specialists and Critical Link species, species beneficially associated with salmonids, and species that perform focal KEFs.

Bank sites that provide habitat for several desired focal species are assigned higher incremental values for the focal species element (Table 11).

TABLE 11

Focal species element of the landscape context factor.

| Number of desired focal species for which the bank site potentially provides habitat | Incremental Value ($f_S$) |
|---|---|
| >20 | 0.01 |
| 16-20 | 0.0075 |
| 11-15 | 0.005 |
| 1-10 | 0.0025 |
| 0 | 0.0 |

Landscape permeability reflects the degree to which wildlife species are able to move between and among suitable habitats. The value of the bank site in maintaining landscape permeability can be described qualitatively as isolated, patchy, mosaic, contiguous, or enclosed (the single term that best describes a given bank site is used for the entire bank) (Table 12).

TABLE 12

Landscape permeability element of the landscape context factor.

| Landscape permeability | Incremental Value ($f_L$) |
|---|---|
| Enclosed (>75% of site perimeter surrounded by natural habitats with extent ≧240 acres) | 0.01 |
| Contiguous (site within 300 feet of one or more tracts of natural habitat with extent ≧120 acres | 0.0075 |
| Mosaic (site within 1500 feet of three or more natural habitat tracts, each with extent ≧60 acres) | 0.005 |
| Patchy (site within 1500 feet of one or two natural habitat tracts, each with extent ≧60 acres | 0.0025 |
| Isolated (no natural habitat tracts with extent ≧60 acres within 1500 feet of site) | 0 |

The landscape context factor for a given habitat type is determined by adding the incremental values for each element (Equation 37), then adding this sum to 0.10. The ratio commonly applied for habitat preservation, when applicable, is 10:1. This is expressed as a multiplier value of 0.10. The minimum value of the landscape context factor is 0.07 and the maximum value is 0.14.

$$F_L = 0.10 + (f_R + f_T + f_S + f_L) \qquad \text{(Equation 37)}$$

where $F_L$ is the landscape context factor for a given habitat type, $f_R$ is the rarity factor for a given habitat type, $f_T$ is the trend factor for a given habitat type, $f_S$ is the species factor for the bank site, and $f_L$ is the landscape permeability factor for the bank site.

Vulnerability Multiplier

The vulnerability of a potential mitigation bank site to development can be quantified using available information relevant to the potential for land development to occur within a given parcel. Factors that may be considered include land ownership, urban growth boundaries, zoning, proximity to existing/proposed roads and developments, and general land use trends in the area surrounding the parcel of interest.

Because accurate predictions of future development may be hard to develop in many instances, the vulnerability multiplier values presented herein are intended as guidance to be used in the credit valuation process. Bank-specific MCBRT's can modify the vulnerability multiplier or deviate from the suggested values. Parcels that are deemed to be at high risk to development are assigned high vulnerability multipliers (Table 13). An example of a site with a very high risk of development is a parcel that is owned by a developer and located within an Urban Growth Boundary and adjacent to a new development that is owned by the same entity. On the other end of the spectrum, areas owned by entities with a conservation mission generally can be assigned very low vulnerability multipliers.

TABLE 13

Vulnerability multiplier.

| Vulnerability to Development | Suggested Vulnerability Multiplier |
|---|---|
| Very High | 1.5 |
| High | 1.25 |
| Moderate | 1.0 |
| Low | 0.5 |
| Very Low | 0.1 |

Conservation Multiplier

The degree to which certain activities increase the legal protection afforded a site can be accounted for with a conservation multiplier that considers the current and proposed legal status of the site. No credit is generated if no measures are implemented to increase site protection.

The conservation multiplier is applied to the entire site. Sites that currently have little or no protection but would be given high levels of protection in the future are assigned conservation multipliers of 0.75 or 1.0, while sites with existing high levels of protection would be assigned lower conservation multipliers (Table 14). As reflected in Table 8, protection mechanisms that involve conservation easements and/or conservation entities are assigned higher protection multipliers, while deed restrictions are assigned lower multipliers.

TABLE 14

Matrix for determining value of conservation multiplier.

|  |  | Proposed Future Site Protection Mechanism | | | | |
| --- | --- | --- | --- | --- | --- | --- |
|  |  | Conservation Entity + Conservation Easement | Conservation Entity + Management Agreement | Conservation Easement | Deed Restriction | No Protection |
| Existing Site Protection | Conservation Entity + Conservation Easement | 0 | 0 | 0 | 0 | 0 |
|  | Conservation Entity + Management Agreement | 0.25 | 0 | 0 | 0 | 0 |
|  | Conservation Easement | 0.50 | 0.25 | 0 | 0 | 0 |
|  | Deed Restriction | 0.75 | 0.50 | 0.25 | 0 | 0 |
|  | No Protection | 1.0 | 0.75 | 0.50 | 0.25 | 0 |

Calculating Credit Value for Preservation

Credit value for habitat preservation can be determined for each map unit by multiplying the baseline habitat value by the landscape context factor, the vulnerability multiplier, and the conservation multiplier (Equation 38). When all factors and multipliers are applied, the minimum overall multiplier value is 0.0018 and the maximum value is 0.18. These values correspond approximately with ratios of 550:1 and 5.5:1, respectively. The values of each component in the equation may vary between individual map units due to differences in habitat types, land use designations, or existing legal encumbrances. As a result, a single preservation multiplier may not be applicable to an entire site. Thus, the preservation credit for the entire site desirably is calculated as the sum of the credit values for each map unit.

$$V_P = \Sigma(V_M \times F_L \times F_V \times F_P) \quad \text{(Equation 38)}$$

where $V_P$ is the preservation credit for a given bank site, $V_M$ is the baseline Habitat Value of a given map unit, $F_L$ is the landscape context factor for a given map unit, $F_V$ is the vulnerability multiplier for a given map unit, and $F_P$ is the conservation multiplier for a given map unit.

Conversion Accounting Method

This accounting method is used to determine the credit value accrued from converting existing low priority habitat types (typically urban and agricultural habitats) into habitat types that provide greater ecological function. This method typically is used when the habitat type classifications of one or more map units are anticipated to change from one habitat type to another.

Credit values are calculated as the difference between future site value (following conversion of habitat types) and baseline site value. In an exemplary embodiment, conversion of habitat types is accounted for in the future site value using the following methodology:

1. Determining the baseline value of the site using the full assessment methodology as previously described. In this specific embodiment, it is assumed that the baseline habitat value is the species value for the site as determined by Equations 1-7.
2. Delineating management actions and determine which map units and habitat types are affected and aggregating proposed management actions such that no more than one action is applied to each map unit (sub-divide map units as needed to accomplish this) and that no action is applied to multiple habitat types.
3. Determining the future invasive species factor for each map unit (for map units not affected by management actions, this value is likely the same as the baseline invasive species factor).
4. For each habitat type, determining the anticipated future acreage and percent of the entire site occupied by that habitat type. The future acreage should reflect the net change in habitat type acreage (in those instances when map units are being converted to and from the given habitat type).
5. For each habitat type, calculate the future DWAASV by multiplying the baseline DWAASV for that habitat type by the ratio of future to baseline habitat type acreage (this ratio is less than one for diminished habitat types and greater than one for enlarged habitat types) (Equation 39).

$$DWAASV' = DWAASV \times (A'_H / A_H) \quad \text{(Equation 39)},$$

where DWAASV' is the future DWAASV of the given habitat type,

DWAASV is the discrete weighted area average species value of the given habitat type, $A'_H$ is the anticipated future area of the given habitat type, and $A_H$ is the baseline area of the given habitat type.

6. For each map unit, determining the anticipated potential future species value by multiplying the future DWAASV' by the area of the map unit, then dividing by the ratio of future habitat type area to total site area.
7. For each map unit, determining the anticipated future species value by multiplying the future potential species value by the future invasive species factor (Equations 40a or 40b).

$$V'_M = DWAASV' \times A_M / (A'_H / A_S) \times F'_S \quad \text{(Equation 40a)}$$

or $$V'_M = V^*{}'_M \times F'_S \quad \text{(Equation 40b)},$$

where $V'_M$ is the future species value of the given map unit,

DWAASV' is the future DWAASV of the given habitat type, $A_M$ is the area of the given map unit, $A'_H$ is the future area of the given habitat type, $A_S$ is the area of the entire site, $F'_S$ is the anticipated future invasive species factor for a given map unit, and $V^{*'}_M$ is the potential future habitat value of the given map unit.

8. Determining the post-project value by summing the anticipated future species values from each map unit.
9. Determining the credit value by subtracting the baseline site value from the anticipated future site value. This method of determining credit value assumes that existing habitat types, structural conditions, and KECs will be maintained and that the site will continue in a state of equilibrium.

In an alternative embodiment, the baseline value can be established by determining a species value and a correlate value for the site and averaging these values. The post-project value for the site can be established in a similar manner. Specifically, the future DWAACV' of each habitat can be determined by multiplying the baseline DWAACV for each habitat by the ratio of the future to baseline habitat type acreage ($A'_H/A_H$) similar to Equation 39. The potential future correlate value of each map unit can be determined by multiplying the future DWAACV by the map unit area and then dividing by the ratio of future habitat type area to total site area. The anticipated future correlate value of each map unit can be determined by multiplying the future potential correlate value by the future invasive species factor similar to Equations 40a and 40b. The post-projection correlate value for the entire site can be established by summing the anticipated future values for each map unit. The post-project value for the site can be established by averaging the post-project correlate value for the site and the post-project species value for the site (determined in step 8 above), or alternatively, summing the post-project correlate value for the site and the post-project species value for the site. The credit value of the site can be determined by subtracting the baseline value from the anticipated post-project value.

Augmentation Accounting Method

The augmentation accounting method is used to determine the credit value accrued from maintaining, enhancing, or creating KECs within an existing habitat type. This method typically is used when the habitat type classifications of one or more map units are not anticipated to change from one habitat type to another.

Credit values are calculated as the difference between future site value (following creation or enhancement of KECs) and baseline site value. In an exemplary embodiment, creation and enhancement of KECs is accounted for in the future site value using the following methodology:

1. Determining the baseline Habitat Values of the site and individual map units using the full assessment methodology.
2. Delineating management actions and determining which map units and habitat types are affected and aggregating proposed management actions such that no more than one action is applied to each map unit (sub-divide map units as needed to accomplish this) and that no action is applied to multiple habitat types.
3. For each proposed action, developing a list of KECs that will be permanently affected (beneficially and adversely) in, for example, the twenty-year period following implementation of the action. (The twenty-year horizon accommodates consideration of ecological change likely to occur in the reasonably foreseeable future. Many anticipated benefits would not be considered if a shorter time period were used. A longer time period would require extrapolation beyond what is reasonably foreseeable.)
4. For each management action within each habitat type, determining the number of KECs that will be created (i.e., that will be beneficially affected but do not currently exist within the affected habitat type) and that will be enhanced (i.e., that will be beneficially affected and currently exist within the affected habitat type).
5. For each management action, determining the initial estimate of the credit multiplier (also referred to herein as an augmentation multiplier) by comparing the number of KECs created and enhanced with the number of existing KECs (Equation 41). This calculation gives more value to newly created KECs than to enhanced KECs, as reflected in the 0.33 multiplier for enhanced KECs. The use of the 0.33 multiplier corresponds with the three-to-one ratio commonly applied to wetland enhancement projects, although this value can vary depending on the application.

$$M_A = 1 + (k_c/k) + [0.33 \times (k_e/k)] \quad \text{(Equation 41)},$$

where $M_A$ is the initial estimate of the credit multiplier for the management action, $k_c$ is the number of KECs created by the management action, and $k_e$ is the number of KECs enhanced by the management action.

6. In consultation with the bank-specific MCBRT, determining the credit multiplier to be applied for each management action. This value should consider the initial credit multiplier estimate(s) determined for each management action.
7. For each affected map unit, determining the anticipated future invasive species factor. In essence, this represents the target for areal cover of invasive species. As such, it is particularly important in those instances where management actions are focused on invasive species control.
8. Calculating the anticipated future habitat value for each map unit utilizing the future DWAASV (if no conversion of habitat types is anticipated, this value equals the baseline DWAASV; otherwise, refer to Equation 39), the areas of the map unit and the affected habitat type, the credit multiplier, and the anticipated future invasive species factor (Equation 42).

$$V'_M = (DWAASV' \times A_M \times M_A \times F'_S)/(A'_H/A_S) \quad \text{(Equation 42)},$$

where $V'_M$ is the future Habitat Value of the given map unit,

DWAASV' is the future DWAASV of the given habitat type (equal to baseline DWAASV if habitat type not affected by conversion actions elsewhere on the site), $A_M$ is the area of the given map unit, $M_A$ is the initial estimate of the credit multiplier for the management action, $F'_S$ is the anticipated future Invasive Species Factor for a given map unit, $A'_H$ is the future area of the given habitat type (equal to baseline $A_H$ if habitat type not affected by conversion actions elsewhere on the site), and $A_S$ is the area of the entire site.

9. Determining the future habitat value by summing the future habitat values of the individual map units.
10. Determining the credit value by subtracting the baseline site value from the anticipated future site value. This method of determining credit value assumes that existing KECs will be maintained and that the site will continue in a state of equilibrium.

In those instances when the baseline habitat values of individual map units (or entire sites) are not at equilibrium, the "future habitat value without intervention" can be calculated for each map unit by adjusting the invasive species factor and/or by determining which KECs would be likely to become more or less abundant were it not for management intervention (Equation 43).

$$V_M'' = V_M \times (F_S''/F_S) \times (k''/k) \quad \text{(Equation 43)},$$

where $V_M''$ is the anticipated future habitat value for the given map unit in the absence of management intervention, $V_M$ is the baseline habitat value of the given map unit, $F_S''$ is the anticipated future invasive species factor for the given map unit in the absence of management intervention, F is the baseline invasive species factor for the given map unit, k" is the anticipated future number of habitat elements present in the given map unit in the absence of management intervention, and k is the baseline number of KECs present in the given map unit.

If management actions will be implemented to control invasive species and/or maintain existing KECs, the credit value for prescriptive management can be calculated for each map unit as the difference between the baseline habitat value and the future habitat value without intervention. The total credit value for prescriptive management is then determined as the sum of values from individual map units.

Combinations of Accounting Methods

The suite of mitigation/conservation activities proposed within a given bank can include the use of multiple accounting methods. When multiple accounting methods are required within a given bank, but not within a given habitat type, the appropriate accounting method can be used to determine credit values within each habitat type, and the credit value for the entire bank can be determined as the sum of credit values for individual map units.

In an exemplary approach, when multiple accounting methods are required within a single habitat type, the methods are applied to each map unit affected by each management action in the following manner:
1. Preservation credit value is determined for each habitat type on the basis of habitat value, landscape context, vulnerability to development, and level of protection.
2. Conversion credit value is determined on the basis of future DWAASVs.
3. Augmentation credit value is determined as the difference between future habitat value (calculated using future DWAASVs and credit multipliers) and baseline habitat value, less any credit value accrued from conversion.

Wetland Credit Generation

Credits for wetland mitigation are typically expressed in terms of acres, using the definitions and ratios stipulated in state rules (e.g., OAR 141-85-135). The rules provide that restoration is credited at a ratio of 1:1, creation at a ratio of 1.5:1, and enhancement at a ratio of 3:1. Disturbed cropped wetlands are credited at a ratio of 2:1. For restoration, this means that each acre of restored wetland generates one mitigation credit. If credits are to be generated by creation or enhancement, 1.5 acres of created wetland or 3.0 acres of wetland enhancement, respectively, are required to generate one mitigation credit. Credits for wetland buffers and preservation may also be available at specific banks, subsequent to approval and ratio determination in coordination the bank-specific MCBRT.

Anticipated changes in the occurrence or rate of abiotic functions can be documented for each mitigation/conservation bank. The assessment of functional enhancement can use a 20-year forecasting "horizon" (the same as used for anticipating changes in Habitat Value).

Availability of wetland credits can be determined according to the credit release schedule described in the establishment plan for each bank.

Species-Specific Credit Generation

Species-specific credit can be generated via two general types of activities: habitat creation/restoration/enhancement or habitat preservation. The methods described below provide the basis for determining the precise number of credits generated by particular activities.

Habitat Creation/Restoration/Enhancement Actions

Credits for mitigation/conservation activities are determined as the difference between anticipated future species-specific value (due to changes in extent, suitability, utility, or integrity) and current species-specific value (Equation 43). Anticipated future species-specific values can be forecast for a twenty-year period. As with adverse impacts to habitat connectivity, credits for partially or completely restoring access to suitable habitat accrue on the basis of the habitat extent and quality and the degree to which access is restored.

Habitat Preservation Actions

Although the ESA and CWA include mechanisms to protect occupied habitat of listed species and jurisdictional waters of the state, areas adjacent to protected habitats may be vulnerable to development activities that could alter habitat-forming processes and/or habitat conditions. In perpetuity preservation of habitat can be an important element of conservation planning, especially for those species whose habitat is difficult to restore.

In particular embodiments, the amount of credit available for habitat preservation is based on four factors: baseline species-specific value, vulnerability to development, degree of protection afforded to the bank site, and degree of emphasis placed on habitat preservation (instead of creation, enhancement, or restoration) by appropriate regulatory agency. The factors for vulnerability and degree of protection can be determined using the same methods as for habitat value calculations. Unlike Habitat Value calculations, credit valuation for preservation of habitat for specific species does not consider landscape context. The purpose of the landscape context factor is to assess the role of the bank site in broader wildlife-habitat relationships. Because suitable habitat for specific species is the a priori focus of the species-specific accounting method, such consideration of landscape context is unnecessary.

The risk that a site will be affected by development activities can be assessed using a vulnerability multiplier based on the same criteria as the preservation accounting method for overall habitat value (see Table 13).

The degree of protection afforded to the site can be assessed using a conservation multiplier based on the same criteria as the preservation accounting method for Habitat Value (see Table 14).

The "preservation emphasis" multiplier reflects the role of habitat preservation plays in the recovery strategy for the target species. This factor is determined on a species-by-species basis, and ranges from 0.1 to 1.0. The multiplier will be low for species for which life history requirements are well known and for which habitat creation, enhancement, or restoration techniques are feasible and proven. The multiplier will be high for species with habitat requirements that are unknown or difficult to successfully create/enhance/restore. High values for this multiplier indicate a higher incentive for habitat preservation.

Preservation credit at a particular site can be calculated by multiplying the baseline value with the three multiplier factors (Equation 44). When the three multipliers are factored together, the minimum overall multiplier value is 0.0025 and the maximum is 1.0. These values correspond with ratios of 400:1 and 1:1, respectively.

$$S_P = S_M \times F_V \times F_P \times F_A \quad \text{(Equation 44)},$$

where $S_P$ is the credit for species-specific habitat preservation, $S_M$ is the baseline species-specific value of a given habitat unit for a given species/lifestage, $F_V$ is the vulnerability multiplier for a given bank site, $F_P$ is the conservation multiplier for a given bank site, and $F_A$ is the preservation emphasis multiplier for a given species.

Accounting Ledgers and Credit Release Scheduling

Accounting Ledgers

In another aspect of the system, the accrual and availability of debits and credits for natural resource values can be recorded in accounting ledgers developed for each mitigation bank. The purpose of the accounting ledger is to document the certification and sale of credits for habitat value and to track the use of credits for wetlands and certain ESA-listed species. Accounting ledgers prepared for each bank are designed to facilitate queries of credit availability and use.

Information regarding credits can be updated as success criteria are achieved, and includes the date of credit certification, the type of credit (habitat value, wetlands, and/or species-specific), the habitat type associated with the credit, the mitigation/conservation activity associated with the credit, and the specific success criteria associated with the credit certification.

Credit Release Scheduling

The availability of habitat value credits and "backstop" credits can be determined via establishment and monitoring of bank-specific success criteria. These criteria are incorporated within bank-specific establishment plans. Certain success criteria may apply to the entire bank, while others may apply to map units affected by individual management actions. Credit release subsequent to attainment of success criteria may occur in either absolute (i.e., 20 habitat value credits) or proportional (i.e., 35% of credits accrued from a given management action) terms.

The success criteria for wetlands and species-specific credit release can include many of the criteria used for habitat value credit release, although additional species-specific success criteria may be required to address recovery goals defined by the Services (such as population trend and abundance). Unlike habitat value credits, wetland and species-specific credits will not be bought on a project-by-project basis. As projects requiring wetland and/or species-specific credits are implemented, however, credits will be withdrawn from the accounting ledger.

Example 1

In this example, the baseline habitat value and adjusted baseline habitat value for a mitigation site and selected map units of the site were calculated using Equations 1-7. First, the habitat types, a potential species list, and sets of KEFs for each habitat type were determined from data collected from a field inventory of the site. Table 15 shows selected map units from the site and the size (in acres) and habitat type (Appendix A) for each map unit. Table 16 shows the total area, Ah, (in acres) occupied by each habitat type in the site and the proportional extent of each habitat type, Ah/As. Table 17 shows the number of species associated with each KEF (see Appendix D) for each habitat type and the total number of KEFs performed in each habitat type.

Table 18 shows the weighted value WVi for each KEF in each habitat type calculated using Equation 1. For example, applying Equation 1, the weighted value for KEF 1.1.1.1 in habitat type 1 is 1.40, which is calculated by multiplying the number of species associated with the KEF from Table 17 (8) by the proportional extent of the habitat type, Ah/As (0.1751). The bottom row in Table 18 provides the multivalue, SMV, for each habitat type determined by summing the weighted values in each habitat type (Equation 2a or 2b).

Table 19 shows the discrete weighted area average value, DWAASV, calculated for each habitat type using Equation 3. Specifically, the DWAASV for each habitat type was calculated by dividing the multivalue, SMV, by the number of KEFs performed in each habitat type.

Table 20 shows the baseline habitat values for the selected map units identified in Table 15. The baseline habitat values for the map units were calculated using Equation 5b. Table 20 also shows the total habitat value for the selected map units as a whole derived by summing the habitat values for the map units.

Applying Equation 4, the weighted area average value for the entire site, WAASV, (the sum of the DWAASVs in Table 19) is 12.94. Applying Equation 5a, the baseline habitat value for the entire site is 6,315, which is calculated by multiplying the WAASV (12.94) by the area of the entire site (488 acres).

The baseline habitat values for the selected map units were then adjusted to account for invasive plant species. In this example, the adjustment factors provided in Table 21 were used to calculate the aggregate adjustment factor FS for each map unit. Table 22 shows the adjustment factors (from Table 21) applied to each structural layer (grass/forbs, shrubs, and trees) in each map unit, and the aggregate invasive species adjustment factor FS for each map unit calculated using Equation 6c.

Table 23 shows the corrected or adjusted baseline habitat value for each map unit calculated using Equation 7b. Each adjusted value is calculated by multiplying the baseline value (Table 20) by the aggregate invasive species adjustment factor FS (Table 22). Table 23 also shows the adjusted habitat value for the selected map units as a whole derived by summing the adjusted values for the map units. Thus, in this example, the baseline habitat value of the selected map units of 595.46 (Table 20) was adjusted to 477.34 (Table 23) to account for the presence of invasive plant species. The adjusted habitat value for the entire site can be derived by calculating the adjusted habitat value for each map unit in the site and summing those values. Table 24 shows the adjusted habitat values for each of the selected map unit on a per acre basis.

TABLE 15

(Selected Polygon ID's, Acreages and Habitat Types)

| MIT_SITE | SITE_ID | Acres | Habitat Type |
|---|---|---|---|
| Mirror Lake | MP-298 | 4.32 | 1 |
| Mirror Lake | MP-288 | 0.90 | 2 |
| Mirror Lake | MP-002 | 4.49 | 11 |
| Mirror Lake | MP-073 | 0.73 | 20 |
| Mirror Lake | MP-004 | 5.89 | 21 |
| Mirror Lake | MP-168 | 24.01 | 22 |
| Mirror Lake | MP-237 | 13.56 | 23 |
| | Total | 53.90 | |

TABLE 16

(Original Condition Habitat Proportions)

| Habitat Type | REG TEXT | Acres | Ah/As | |
|---|---|---|---|---|
| 1 | Westside Lowlands Conifer-Deciduous Forest | 85.54 | 85.54/488.52 = | 0.1751 |
| 2 | Westside Oak and Dry Douglas-fir Forest and Woodlands | 0.90 | 0.90/488.52 = | 0.0018 |
| 11 | Westside Grasslands | 20.55 | 20.55/488.52 = | 0.0421 |
| 20 | Urban and Mixed Environs | 3.54 | 3.54/488.52 = | 0.0072 |
| 21 | Lakes, Ponds, Reservoirs, and Rivers | 29.41 | 29.41/488.52 = | 0.0602 |
| 22 | Herbaceous Wetlands | 142.45 | 142.45/488.52 = | 0.2916 |
| 23 | Westside Riparian-Wetlands | 205.40 | 205.40/488.52 = | 0.4205 |
| | Total Acres of Mirror Lake Site (Baseline Condition) | 488.52 | | |

TABLE 17

(Number of species associated with each KEF by habitat type)

| | Habitat Type | | | | | | |
|---|---|---|---|---|---|---|---|
| SHP-KEF | 1 | 2 | 11 | 20 | 21 | 22 | 23 |
| 1.1.1.1 | 8 | 6 | 3 | 0 | 2 | 9 | 15 |
| 1.1.1.10 | 10 | 10 | 2 | 2 | 0 | 0 | 10 |
| 1.1.1.11 | 1 | 2 | 1 | 0 | 10 | 14 | 15 |
| 1.1.1.12 | 1 | 1 | 1 | 11 | 10 | 5 | 5 |
| 1.1.1.13 | 3 | 3 | 1 | 0 | 0 | 2 | 4 |
| 1.1.1.14 | 0 | 0 | 0 | 0 | 2 | 0 | 0 |
| 1.1.1.15 | 0 | 0 | 0 | 0 | 18 | 1 | 0 |
| 1.1.1.2 | 38 | 39 | 20 | 0 | 1 | 12 | 40 |
| 1.1.1.3 | 5 | 3 | 2 | 0 | 0 | 1 | 7 |
| 1.1.1.4 | 12 | 10 | 8 | 0 | 2 | 5 | 13 |
| ~ | ~ | ~ | ~ | Select KEF's only for ease of presentation | | ~ | ~ |
| 8.1 | 2 | 2 | 0 | 0 | 0 | 1 | 4 |
| 8.2 | 4 | 2 | 1 | 0 | 0 | 0 | 4 |
| 8.3 | 2 | 1 | 1 | 0 | 0 | 1 | 4 |
| Number of KEF's Performed in Habitat Type | 63 | 62 | 57 | 32 | 57 | 61 | 68 |

TABLE 18

(Weighted Value for each KEF in each habitat type (Equation 1) and the Multivalue for each habitat type (Equation 2a or 2b))

| | Weighted Value Ah/As | | | | | | |
|---|---|---|---|---|---|---|---|
| | 0.1751 | 0.0018 | 0.0421 | 0.0072 | 0.0602 | 0.2916 | 0.4205 |
| | Habitat Type | | | | | | |
| SHP-KEF | 1 | 2 | 11 | 20 | 21 | 22 | 23 |
| 1.1.1.1 | 1.40 | 0.01 | 0.13 | 0.00 | 0.12 | 2.62 | 6.31 |
| 1.1.1.10 | 1.75 | 0.02 | 0.08 | 0.01 | 0.00 | 0.00 | 4.20 |
| 1.1.1.11 | 0.18 | 0.00 | 0.04 | 0.00 | 0.60 | 4.08 | 6.31 |
| 1.1.1.12 | 0.18 | 0.00 | 0.04 | 0.08 | 0.60 | 1.46 | 2.10 |
| 1.1.1.13 | 0.53 | 0.01 | 0.04 | 0.00 | 0.00 | 0.58 | 1.68 |
| 1.1.1.14 | 0.00 | 0.00 | 0.00 | 0.00 | 0.12 | 0.00 | 0.00 |
| 1.1.1.15 | 0.00 | 0.00 | 0.00 | 0.00 | 1.08 | 0.29 | 0.00 |
| 1.1.1.2 | 6.65 | 0.07 | 0.84 | 0.00 | 0.06 | 3.50 | 16.82 |
| 1.1.1.3 | 0.88 | 0.01 | 0.08 | 0.00 | 0.00 | 0.29 | 2.94 |
| 1.1.1.4 | 2.10 | 0.02 | 0.34 | 0.00 | 0.12 | 1.46 | 5.47 |
| ~ | ~ | ~ | Select KEF's only for ease of presentation | | | ~ | ~ |
| 8.1 | 0.35 | 0.00 | 0.00 | 0.00 | 0.00 | 0.28 | 1.75 |
| 8.2 | 0.70 | 0.00 | 0.04 | 0.00 | 0.00 | 0.00 | 1.75 |
| 8.3 | 0.35 | 0.00 | 0.04 | 0.00 | 0.00 | 0.28 | 1.75 |
| SUM of Weighted Values = Multi-Value of the Habitat | 161.91 | 1.86 | 20.52 | 0.96 | 53.01 | 114.07 | 486.20 |

TABLE 19

(DWAASV - Discrete Weighted Area Average Value - Multi-Value/
Number of KEF's by Habitat)

| | Habitat Type | | | | | | |
|---|---|---|---|---|---|---|---|
| SHP-KEF | 1 | 2 | 11 | 20 | 21 | 22 | 23 |
| SUM of Weighted Values = Multi-Value of the Habitat | 161.91 | 1.86 | 20.52 | 0.96 | 53.01 | 114.07 | 486.20 |
| Number of KEF's Performed in Habitat Type | 63 | 62 | 57 | 32 | 57 | 61 | 68 |

TABLE 19-continued (DWAASV - Discrete Weighted Area Average Value - Multi-Value/
Number of KEF's by Habitat)

| | Habitat Type | | | | | | |
|---|---|---|---|---|---|---|---|
| SHP-KEF | 1 | 2 | 11 | 20 | 21 | 22 | 23 |
| Discrete Weighted Area Average (DWAASV) | 2.57 | 0.03 | 0.36 | 0.03 | 0.93 | 1.87 | 7.15 |

TABLE 20

(Calculation of Baseline Values)

| MIT_SITE | SITE_ID | REG_CLASS | DWAASV | Acres | Ah/As | Baseline Value (V * m) |
|---|---|---|---|---|---|---|
| Mirror Lake | MP-298 | 1 | 2.57 | 4.32 | 0.1751 | 63.43 |
| Mirror Lake | MP-288 | 2 | 0.03 | 0.90 | 0.0018 | 15.00 |
| Mirror Lake | MP-002 | 11 | 0.36 | 4.49 | 0.0421 | 38.43 |
| Mirror Lake | MP-073 | 20 | 0.03 | 0.73 | 0.0072 | 3.03 |
| Mirror Lake | MP-004 | 21 | 0.93 | 5.89 | 0.0602 | 91.00 |
| Mirror Lake | MP-168 | 22 | 1.87 | 24.01 | 0.2916 | 156.10 |
| Mirror Lake | MP-237 | 23 | 7.15 | 13.56 | 0.4205 | 228.47 |
| | | | | | Sum of Baseline Values of Selected Map Units | 595.46 |

TABLE 21

(Adjustment factors applied to three structural layers in each polygon)

| Percent of Areal Coverage of Invasive Species for Each Polygon | Invasive Adjustment Factor |
|---|---|
| ≦10% | 1.0 |
| 11-35% | 0.9 |
| 36-65% | 0.8 |
| 66-90% | 0.7 |
| >90% | 0.5 |

TABLE 22

| SITE_ID | INVASIVE | Fs_Grass | Fs_Shrub | Fs_Tree | FS |
|---|---|---|---|---|---|
| MP-298 | Himalayan blackberry (RUDI), English holly (ILAQ) | 0.7 | 0.7 | 1 | 0.79 |
| MP-288 | Himalayan blackberry (RUDI) | 0.5 | 1 | 1 | 0.79 |
| MP-002 | (Bluegrass (POASPP), Bentgrass (AGRSPP), Downy cheat grass (BRTE), Canada goldenrod (SOCA) | 0.7 | 0.7 | 1 | 0.79 |
| MP-073 | Various weed species | 0.7 | 1 | 1 | 0.89 |
| MP-004 | Reed canarygrass (PHAR) | 0.9 | 0.7 | 1 | 0.86 |
| MP-168 | Reed canarygrass (PHAR) | 0.9 | 0.5 | 1 | 0.77 |
| MP-237 | Reed canarygrass (PHAR), Canada thistle (CIAR) | 0.7 | 0.9 | 1 | 0.86 |

TABLE 23

(Baseline Site value corrected for the presence of invasive species)

| MIT_SITE | SITE_ID | REG_CLASS | Baseline Value (V'm) | F_S | Corrected Baseline Value (Vm) |
|---|---|---|---|---|---|
| Mirror Lake | MP-298 | 1 | 63.43 | 0.79 | 50.00 |
| Mirror Lake | MP-288 | 2 | 15.00 | 0.71 | 10.61 |
| Mirror Lake | MP-002 | 11 | 38.43 | 0.70 | 26.90 |
| Mirror Lake | MP-073 | 20 | 3.03 | 0.70 | 2.12 |
| Mirror Lake | MP-004 | 21 | 91.00 | 0.79 | 72.23 |
| Mirror Lake | MP-168 | 22 | 156.10 | 0.77 | 119.62 |
| Mirror Lake | MP-237 | 23 | 228.47 | 0.86 | 195.86 |
| Sum of Corrected Baseline Values for Selected Map Units | | | | | 477.34 |

TABLE 24

(Map unit baseline site values corrected for the presence of invasive species per acre)

| MIT_SITE | SITE_ID | REG_CLASS | Baseline Value (V'm) | Acres | Corrected Baseline Value per acre (Vm/Acre) |
|---|---|---|---|---|---|
| Mirror Lake | MP-298 | 1 | 50.00 | 4.32 | 11.57 |
| Mirror Lake | MP-288 | 2 | 10.61 | 0.90 | 11.79 |
| Mirror Lake | MP-002 | 11 | 26.90 | 4.49 | 5.99 |
| Mirror Lake | MP-073 | 20 | 2.12 | 0.73 | 2.90 |
| Mirror Lake | MP-004 | 21 | 72.23 | 5.89 | 12.26 |
| Mirror Lake | MP-168 | 22 | 119.62 | 24.01 | 4.98 |
| Mirror Lake | MP-237 | 23 | 195.86 | 13.56 | 14.44 |

Example 2

This example demonstrates the calculation of an anticipated (future) habitat value following enhancement activities to the mitigation site discussed in Example 1. Table 25 lists three proposed management activities for the site (identified as MA1, MA2, and MA3). For each management activity, Table 25 provides the number of existing KECs in the map units where the activity will occur, new KECs created in the map units where the activity will occur, and existing KECs in those map units that will be enhanced from the activity. For example, MA1 will be implemented in map units in which 27 KECs currently exist, and will create 17 new KECs and enhance 9 existing KECs in those map units. Table 25 also provides the augmentation multiplier calculated for each management activity using Equation 26.

Table 26 shows the future habitat values for the selected map units of Table 15, which were derived using Equation 27 (but without taking into consideration an anticipated future invasive species factor, F's). In this example, the future DWAASV' values were equal to the DWAASV values provided in Table 19.

The future habitat values were then adjusted to account for the anticipated coverage of invasive species in the map units. In this example, the adjustment factors listed in Table 21 were used to determine an aggregate adjustment factor for each map unit. The adjustment factors for each structural layer (existing or future) in the map units were selected based on what would be expected in the future in view of the management activities that were prescribed. Table 27 lists the adjustment factor assigned to each structural layer and an aggregate invasive species adjustment factor, F's, calculated for each map unit using Equation 6a, 6b, or 6c.

Table 28 shows the adjusted future value of each map unit calculated by multiplying the future value (Table 26) by the respective adjustment factor F's. When determining the adjusted future values, this calculation can be combined with the calculation of the future habitat values (as expressed in Equation 27). The adjusted future habitat value for the entire site can be derived by calculating the adjusted future habitat value for each map unit in the site and summing those values. Table 29 shows the adjusted future habitat values for each of the selected map unit on a per acre basis.

In example 1, the adjusted baseline (pre-enhancement) habitat value of the selected map units was determined to be 477.34 (Table 23). Because of the proposed enhancement activities, the future habitat value of the selected map units increased to 796.95 (Table 28), a potential credit of 319.61.

TABLE 25

(Proposed management activities)

| | MA1 | MA2 | MA3 |
|---|---|---|---|
| Original KEC count | 27 | 36 | 18 |
| Future New KEC's | 17 | 30 | 5 |
| Future Enhanced KEC's | 9 | 1 | 3 |
| Augmentation Multiplier | 1.74 | 1.84 | 1.33 |

TABLE 26

(Calculation of Future Habitat Values)

| MIT_SITE | SITE_ID | REG_CLASS | DWAASV' | Acres | Ah/As | Augmentation Multiplier | Future Value (V * m') |
|---|---|---|---|---|---|---|---|
| Mirror Lake | MP-298 | 1 | 2.57 | 4.32 | 0.1751 | 1.74 | 110.33 |
| Mirror Lake | MP-288 | 2 | 0.03 | 0.90 | 0.0018 | 1.74 | 26.10 |
| Mirror Lake | MP-002 | 11 | 0.36 | 4.49 | 0.0421 | 1.00 | 38.39 |
| Mirror Lake | MP-073 | 20 | 0.03 | 0.73 | 0.0072 | 1.00 | 3.04 |
| Mirror Lake | MP-004 | 21 | 0.93 | 5.89 | 0.0602 | 1.85 | 168.33 |
| Mirror Lake | MP-168 | 22 | 1.87 | 24.01 | 0.2755 | 1.31 | 213.49 |
| Mirror Lake | MP-237 | 23 | 7.15 | 13.56 | 0.4377 | 1.31 | 290.18 |
| | | | | | Sum of Polygon Future Values | | 849.86 |

TABLE 27

| SITE_ID | INVASIVE | Fs_Grass | Fs_Shrub | Fs_Tree | F'S |
|---|---|---|---|---|---|
| MP-298 | Himalayan blackberry (RUDI), English holly (ILAQ) | 0.9 | 0.9 | 1 | 0.93 |
| MP-288 | Himalayan blackberry (RUDI) | 0.7 | | 1 | 0.84 |
| MP-002 | Bluegrass (POASPP), Bentgrass (AGRSPP), Downy cheat grass (BRTE), Canada goldenrod (SOCA) | 0.7 | 0.7 | | 0.70 |
| MP-073 | Various weed species | 0.7 | 0 | 0 | 0.70 |
| MP-004 | Reed canarygrass (PHAR) | 1 | 0.9 | 0 | 0.95 |
| MP-168 | Reed canarygrass (PHAR) | 1 | 0.9 | 1 | 0.96 |
| MP-237 | Reed canarygrass (PHAR), Canada thistle (CIAR) | 0.9 | 1 | 1 | 0.96 |

TABLE 28

(Future Site values corrected for the presence of invasive species)

| MIT_SITE | SITE_ID | REG_CLASS | Future Value(V'm) | F'S | Corrected Future Value (Vm) |
|---|---|---|---|---|---|
| Mirror Lake | MP-298 | 1 | 110.33 | 0.93 | 102.61 |
| Mirror Lake | MP-288 | 2 | 26.10 | 0.84 | 21.92 |
| Mirror Lake | MP-002 | 11 | 38.39 | 0.70 | 26.87 |
| Mirror Lake | MP-073 | 20 | 3.04 | 0.70 | 2.12 |
| Mirror Lake | MP-004 | 21 | 168.33 | 0.95 | 159.91 |
| Mirror Lake | MP-168 | 22 | 213.49 | 0.96 | 204.95 |
| Mirror Lake | MP-237 | 23 | 290.18 | 0.96 | 278.57 |
| | | Sum of Corrected Polygon Future Values | | | 796.95 |

TABLE 29

(Map unit future site values corrected for the presence of invasive species per acre)

| MIT_SITE | SITE_ID | REG_CLASS | Future Value (V'm) | Acres | Corrected Future Value per acre (Vm/Acre) |
|---|---|---|---|---|---|
| Mirror Lake | MP-298 | 1 | 102.61 | 4.32 | 23.75 |
| Mirror Lake | MP-288 | 2 | 21.92 | 0.90 | 24.35 |
| Mirror Lake | MP-002 | 11 | 26.87 | 4.49 | 5.98 |
| Mirror Lake | MP-073 | 20 | 2.12 | 0.73 | 2.90 |
| Mirror Lake | MP-004 | 21 | 159.91 | 5.89 | 27.15 |
| Mirror Lake | MP-168 | 22 | 204.95 | 24.01 | 8.54 |
| Mirror Lake | MP-237 | 23 | 278.57 | 13.56 | 20.54 |

Having described the principles of the disclosed technology, it will be apparent to those skilled in the art that the disclosed embodiments can be modified in arrangement and detail without departing from such principles. Rather, the disclosed technology includes all novel and nonobvious features and aspects of the various disclosed apparatus, methods, systems, and equivalents thereof, alone and in various combinations and subcombinations with one another.

I claim:

1. A method of establishing a habitat value for at least one habitat type within a geographic site comprising one or more habitat types, the method comprising:
    determining a potential species group, the potential species group comprising vertebrate species that are potentially present at the geographic site;
    determining a set of potential ecological functions for each of the one or more habitat types, the set of potential ecological functions comprising a plurality of types of potential ecological interactions between species of the potential species group and the one or more habitat types at the geographic site;
    determining a functional capacity value for at least one selected habitat type of the one or more habitat types based on the potential ecological functions associated with the at least one selected habitat type;
    determining a habitat value for the at least one selected habitat type based at least in part upon the functional capacity value; and
    recording the determined habitat value for the at least one selected habitat type;
    wherein the act of determining the functional capacity value comprises determining a multivalue for the at least one selected habitat type by summing the number of species Si performing each potential ecological function KEFi in the selected habitat type and multiplying the sum by the percentage of the total area of the geographic site area occupied by the habitat type in accordance with the following equation:

$$SMV = [\Sigma(Si)] \times (A_H/A_S),$$

where: SMV is the multivalue for the selected habitat type,
Si is the number of species performing each KEFi,
$A_H$ is the area of the given habitat type,
$A_S$ is the area of the entire site.

2. The method of claim 1, wherein the act of determining a functional capacity value for at least one selected habitat type comprises:
    modifying the multivalue of the at least one selected habitat type by dividing the multivalue by the number of KEFs performed in the at least one selected habitat type to obtain a discrete weighted area average species value for the at least one selected habitat type.

3. A method according to claim 2 wherein there are a plurality of habitat types at the geographic site, wherein the act of determining a multivalue comprises determining a multivalue for at least each of a selected plurality of habitat types that are selected from the plural habitat types at the geographic site, wherein the act of modifying the multivalue comprises determining a discrete weighted area average species value for each of the selected plurality of habitat types, and wherein the act of determining the habitat value comprises the act of determining the habitat value for the selected plurality of habitat types by summing the discrete weighted area average species values for the selected plurality of habitat types to obtain a composite weighted area average species value corresponding to the selected plurality of habitat types.

4. A method according to claim 3 wherein the act of determining the habitat value comprises multiplying the composite weighted area average species value by the area of the selected plurality of habitat types to determine a potential habitat value for the selected plurality of habitat types and allocating the potential habitat value for the selected habitat types to individual map units corresponding to the selected habitat types, the individual map units each corresponding to a respective portion of the geographic site.

5. A method according to claim 3 wherein the act of determining the habitat value comprises multiplying the composite weighted area average species value by the area of the selected plurality of habitat types to determine a potential habitat value for the selected plurality of habitat types, adjusting the potential habitat value for the selected plurality of habitat types to account for the potential presence of invasive species in the selected plurality of habitat types, and allocating the adjusted potential habitat value for the selected habitat types to individual map units corresponding to the selected habitat types, the individual map units each corresponding to a respective portion of the geographic site.

6. A method according to claim 2
    wherein there are a plurality of habitat types at the geographic site;
    wherein the act of determining a habitat value comprises determining a discrete weighted area average species value (DWAASV) for each of a selected plurality of habitat types, summing the discrete weighted area average species value (DWAASV) for each of the selected plurality of habitat types to determine a composite weighted area average species value (WAASV) for the selected plurality habitat types in accordance with the following equation:

$$WAASV = \Sigma(DWAASV)$$

where: WAASV is the weighted area average species value for the selected plurality habitat types, and
    DWAASV is the discrete weighted area average species value for the given habitat type; and
    wherein the act of determining a habitat value further comprises the act of multiplying the WAASV by the area of the selected habitat types to determine the potential habitat value for the selected habitat types.

7. A method according to claim 6 wherein the selected habitat types include all of the habitat types present at the entire geographic site, wherein the act of multiplying the WAASV by the area of the associated habitat types determines the potential habitat value for the entire site, the method further comprising allocating a potential habitat value for the entire geographic site to individual map units by multiplying the DWAASV for the associated habitat type by the area of the map unit and then dividing by the proportional extent of the habitat type in accordance with the following equation:

$$V^*_S = WAASV \times A_S$$

and $$V^*_M = (DWAASV \times A_M)/(A_H/A_S)$$

where: WAASV is the weighted area average species value for the site
DWAASV is the discrete weighted area average species value for the given habitat type
$V^*_S$ is the potential habitat value for the site
$V^*_M$ is the potential habitat value for the map unit
$A_M$ is the area of the given map unit
$A_H$ is the area of the given habitat type
$A_S$ is the area of the entire site.

8. A method according to claim 7 wherein the individual map units each correspond to a portion of the area of the entire geographic site that is associated with a single habitat type.

9. A method according to claim 7 wherein each map unit corresponds to a portion of the area of the entire geographic site associated with a single habitat type and a single structural condition, if any, associated with the associated habitat type, wherein the structural condition corresponds to a subdivision of the habitat type.

10. A method according to claim 7 comprising the act of adjusting the potential habitat value for each map unit to account for the adverse impacts of invasive species potentially present in the map unit on the potential species and ecological functions associated with each map unit.

11. A method according to claim 10 wherein the act of adjusting comprises multiplying the potential habitat value for each map unit by a factor corresponding to the extent of the potential presence of invasive plant species in the map unit to provide a habitat value for individual map units in accordance with the following equation:

$$V_M = V^*_M \times F_S$$

or $$V_M = (DWAASV \times A_M \times F_S)/(A_H/A_S)$$

where:
$V_M$ is the habitat value for the given map unit
$V^*_M$ is the potential habitat value for the map unit
$F_S$ is an Invasive Species Factor for the given map unit
DWAASV is the discrete weighted area average species value for the given habitat type
$A_M$ is the area of the given map unit
$A_H$ is the area of the given habitat type
$A_S$ is the area of the entire site.

12. A method according to claim 11 comprising the act of establishing a habitat value for the entire geographic site by summing the habitat values for the individual map units included in the geographic site.

13. A method according to claim 11 comprising the act of determining a normalized habitat value for each map unit.

14. A method according to claim 11 comprising the act of determining a post-impact habitat value corresponding to the impact on habitat value arising from a proposed site impacting activity at the geographic site.

15. A method according to claim 14 wherein the post-impact habitat value is determined for each map unit.

16. A method according to claim 15 wherein the post-impact (post-conversion) habitat value is determined in accordance with the following equation:

$$DWAASV' = DWAASV \times (A'_H/A_H)$$

and $$V'_M = (DWAASV' \times A_M \times F'_S)/(A'_H/A_S$$

and $$V'_S = \Sigma(V'_M)$$

where:
DWAASV' is the post-project DWAASV for the habitat type associated with the map unit following habitat type conversion
DWAASV is the discrete weighted area average species value for the baseline habitat type associated with the map unit
$V'_M$ is the post-project habitat value for the given map unit
$A_M$ is the area of the given map unit
$F_S$ is the post-project Invasive Species Factor
$A'_H$ is the post-project extent of the given habitat type
$A_H$ is the baseline extent of the given habitat type
$A_S$ is the area of the entire site
$V'_S$ is the post-project habitat value for the entire site.

17. A method according to claim 16 comprising the act of determining a post modification habitat value according to the following equation:

$$V'_M = V_M \times [(k-k_a)/k] \times (F'_S/F_S)$$

where:
V'M is the post-impact habitat value for the given map unit
$V_M$ is the baseline habitat value for the given map unit
k is the number of KECs present in the map unit
$k_a$ is the number of KECs anticipated to be adversely affected
$F'_S$ is the post-project Invasive Species Factor
$F_S$ is the baseline Invasive Species Factor.

18. A method according to claim 7 comprising performing the acts of claim 1 to establish a habitat value for all habitat types within the geographic site prior to the performance of a site impacting activity at the geographic site to establish a pre-impact habitat value for the geographic site, the method further comprising applying the acts of claim 1 at least to all habitat types within the geographic site expected to be impacted as a result of the performance of the site impact activity to establish an estimated post-impact habitat value for at least the habitat types within the geographic site expected to be impacted, and also comprising the act of determining the difference between the pre-impact and post-impact habitat values for the geographic site.

19. A method according to claim 18 comprising the act of applying the method of claim 1 to a separate geographic site to establish a habitat value for at least one habitat type within the separate geographic site following the performance of a proposed habitat enhancement activity at the separate geographic site to determine a credit habitat value, and offsetting the credit against the difference determined by the method of claim 18.

20. A method according to claim 1 wherein the act of determining the habitat value comprises the act of determining a potential habitat value for the at least one selected habitat type based upon the functional capacity value and adjusting the potential habitat value for the at least one selected habitat type to account for the potential presence of invasive species in the at least one selected habitat type.

21. A method according to claim 1 comprising performing the acts of claim 1 to establish a habitat value for at least one habitat type within the geographic site prior to the performance of a site impacting activity at the geographic site to establish a pre-impact habitat value for the at least one habitat type, the method further comprising applying the acts of claim 1 to the at least one habitat type within the geographic site with the impact of the performance of the site impact activity to said at least one habitat type to establish an estimated post-impact habitat value for the at least one habitat type, and also comprising the act of determining the difference between the pre-impact habitat value and post-impact habitat value for the at least one habitat type.

22. A method according to claim 21 comprising the act of applying the method of claim 1 to a separate geographic site to establish a habitat value for at least one habitat type within the separate geographic site following the performance of a proposed habitat enhancement activity at the separate geographic site to determine a credit habitat value, and offsetting the credit habitat value against the difference determined by the method of claim 21.

23. A method according to claim 1 wherein the potential species group consists of vertebrate species.

24. A method according to claim 23 wherein the potential species group consists of vertebrates selected from lists of birds, amphibians, mammals, reptiles and fish.

25. A method according to claim 1 wherein the set of potential ecological functions is selected from a hierarchically arranged list of important (key) ecological functions associated with the species of the potential species group and with the one or more habitat types at the geographic site.

26. A method according to claim 1 wherein:
the act of determining a functional capacity value for at least one selected habitat type comprises determining a species multivalue and a correlate multivalue for the selected habitat type; and
the act of determining a habitat value for the at least one selected habitat type comprises determining a species value for the selected habitat type based at least in part on the species multivalue, and determining a correlate value for the selected habitat type based at least in part on the correlate multivalue, wherein the habitat value is based on the species value and the correlate value for the selected habitat type.

27. A method according to claim 1, further comprising displaying the determined habitat value for the at least one selected habitat type.

28. A method according to claim 1, wherein the act of determining a potential species group comprises surveying the geographic site to identify key environmental correlates and any structural conditions within the at least one habitat type and inputting into a computer software database the key environmental correlates and any structural conditions of the at least one habitat type to create a list of potential species within the at least one habitat type as identified by the database.

29. A method of establishing a habitat value for a geographic site subdivided into a plurality of map units, the map units being based at least in part upon habitat types included in the geographic site, each map unit being associated with a single habitat type, the method comprising:
establishing a habitat value for each map unit included within the geographic site;
combining habitat values for at least a selected plurality of the map units to establish a potential habitat value for that portion of the geographic site corresponding to the selected plurality of map units;
wherein the act of establishing a habitat value further comprises the act of determining a species-specific value for the geographic site; and
wherein the species specific value is determined in accordance with the following equation:

$$S_M = A_M \times F_S \times F_U$$

where:
$S_M$ is the species-specific value of a given habitat unit for a given species/lifestage
$A_M$ is the area of a given habitat unit
$F_S$ is the HSR of the given habitat unit for a given species
$F_U$ is the Habitat Utility Rating of the site for a given species
and wherein the term HSR comprises a habitat suitability relationship factor indicative of the suitability of the habitat for the given species; and wherein the Habitat Utility Rating is a factor indicative of the specific species ability to use the habitat at the site and is selected from the group comprising (a) the presence and character of connectivity bafflers; and (b) the abundance of the population of the species and proximity to the other populations of the species.

30. A method of establishing a habitat value for geographic site subdivided into a plurality of map units, the map units being based at least in part upon habitat types included in the geographic site, each map unit being associated with a single habitat type, the method comprising:
establishing a species value for each map unit included within the geographic site based at least in part on the species functional redundancy in each map unit;
combining species values for at least a selected plurality of the map units to establish a species value for that portion of the geographic site corresponding to the selected plurality of map units;
establishing a correlate value for each map unit included within the geographic site based at least in part on the correlate functional redundancy in each map unit;
combining correlate values for the selected plurality of the map units to establish a correlate value for that portion of the geographic site corresponding to the selected plurality of map unit; and
establishing a potential habitat value for said portion of the geographic site corresponding to the selected plurality of map units based on the correlate and species values for said portion of the geographic site corresponding to the selected plurality of map units.

31. One or more computer readable storage medium having encoded thereon computer executable instructions for performing a method of establishing a habitat value for at least one habitat type within a geographic site comprising one or more habitat types, the method comprising:
determining a functional capacity value for at least one selected habitat type of the one or more habitat types based on the potential ecological functions associated with the at least one selected habitat type;
determining a habitat value for the at least one selected habitat type based at least in part upon the functional capacity value; and
recording the determined habitat value for the at least one selected habitat type;
wherein the act of determining the functional capacity value comprises determining a multivalue for the at least one selected habitat type by summing the number of species Si performing each potential ecological function KEFi in the selected habitat type and multiplying the sum by the percentage of the total area of the geographic site area occupied by the habitat type in accordance with the following equation:

$$SMV = [\Sigma(Si)] \times (A_H/A_S),$$

where: SMV is the multivalue for the selected habitat type,
Si is the number of species performing each KEFi,
$A_H$ is the area of the given habitat type,
$A_S$ is the area of the entire site.

* * * * *